US012808425B2

(12) United States Patent
Larsson et al.

(10) Patent No.: US 12,808,425 B2
(45) Date of Patent: Nov. 24, 2026

(54) VALVE ARRANGEMENT FOR A SHOCK ABSORBER

(71) Applicant: Advanced Suspension Technology LLC, Northville, MI (US)

(72) Inventors: Fredrik Larsson, Jönköping (SE); Björn Stjärne, Jönköping (SE)

(73) Assignee: Advanced Suspension Technology LLC, Northville, MI (US)

( * ) Notice: Subject to any disclaimer, the term of this patent is extended or adjusted under 35 U.S.C. 154(b) by 615 days.

(21) Appl. No.: 18/275,246

(22) PCT Filed: Feb. 9, 2022

(86) PCT No.: PCT/EP2022/053118

§ 371 (c)(1),
(2) Date: Aug. 1, 2023

(87) PCT Pub. No.: WO2022/171664

PCT Pub. Date: Aug. 18, 2022

(65) Prior Publication Data

US 2024/0159289 A1 May 16, 2024

(30) Foreign Application Priority Data

Feb. 10, 2021 (EP) .................................... 21156280

(51) Int. Cl.
*F16F 9/46* (2006.01)
*B60G 13/08* (2006.01)
(Continued)

(52) U.S. Cl.
CPC ............ *F16F 9/465* (2013.01); *F16F 9/3485* (2013.01); *B60G 13/08* (2013.01);
(Continued)

(58) Field of Classification Search
CPC ...... F16F 9/465; F16F 9/3485; F16F 2222/12; F16F 2228/066; F16F 2230/24; B60G 13/08; B60G 2202/24; B60G 17/08
See application file for complete search history.

(56) References Cited

U.S. PATENT DOCUMENTS

| | | | | |
|---|---|---|---|---|
| 4,958,706 A * | 9/1990 | Richardson | F16F 9/512 188/319.1 |
| 5,234,085 A * | 8/1993 | Schneider | F16F 9/465 188/282.8 |

(Continued)

FOREIGN PATENT DOCUMENTS

| | | |
|---|---|---|
| CN | 210461512 U | 5/2020 |
| CN | 212536510 U | 2/2021 |

(Continued)

OTHER PUBLICATIONS

International Search Report and Written Opinion of the ISA issued in PCT/EP2022/053118, mailed May 31, 2022; ISA/EP.

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

The present disclosure relates to a valve arrangement for a shock absorber. The valve arrangement comprises a valve housing comprising a first and a second port and a pilot chamber being in fluid communication with said first and/or second port, a pilot pressure is defined by a hydraulic pressure in said pilot chamber, a main valve member being axially movably along a longitudinal axis in said valve housing in order to restrict a main fluid flow between said first and second ports in response to said pilot pressure acting on said main valve member. Further, the main valve member is resiliently loaded in a steady-state position from where it is movable in both directions along the longitudinal
(Continued)

axis and is configured to, during an initial pressure increase of the main fluid, move in a direction away from the pilot chamber. The disclosure further relates to a method for controlling a damping medium flow in a shock absorber.

15 Claims, 16 Drawing Sheets

(51) Int. Cl.
*F16F 9/34* (2006.01)
*F16F 9/348* (2006.01)

(52) U.S. Cl.
CPC ...... *B60G 2202/24* (2013.01); *F16F 2222/12* (2013.01); *F16F 2228/066* (2013.01); *F16F 2230/24* (2013.01)

(56) References Cited

U.S. PATENT DOCUMENTS

| | | | | | |
|---|---|---|---|---|---|
| 5,293,971 | A * | 3/1994 | Kanari | F16F 9/348<br>188/282.1 |
| 5,413,196 | A * | 5/1995 | Forster | F16F 9/46<br>188/266.8 |
| 5,586,627 | A * | 12/1996 | Nezu | F16F 9/46<br>188/266.6 |
| 5,699,885 | A * | 12/1997 | Forster | F16F 9/465<br>188/317 |
| 5,810,128 | A * | 9/1998 | Eriksson | F16F 9/342<br>188/289 |
| 6,264,015 | B1 * | 7/2001 | De Kock | F16F 9/465<br>188/282.8 |
| 8,584,818 | B2 * | 11/2013 | Murakami | F16F 9/348<br>188/322.15 |
| 8,794,405 | B2 * | 8/2014 | Yamashita | F16F 9/468<br>188/317 |
| 8,794,407 | B2 * | 8/2014 | Vanbrabant | F16F 9/34<br>188/315 |
| 10,737,546 | B2 * | 8/2020 | Tong | F16F 9/065 |
| 10,995,814 | B2 * | 5/2021 | De Kock | F16F 9/34 |
| 11,472,252 | B2 | 10/2022 | Tong | |
| 11,642,931 | B2 | 5/2023 | Kim | |
| 12,025,204 | B2 * | 7/2024 | Ewers | F16F 9/464 |
| 12,330,459 | B2 | 6/2025 | Tong | |
| 12,377,699 | B2 | 8/2025 | Ericksen et al. | |
| 2003/0106753 | A1 * | 6/2003 | Nezu | B60G 17/08<br>188/316 |
| 2004/0188200 | A1 * | 9/2004 | Katayama | F16F 9/465<br>188/322.15 |
| 2011/0147147 | A1 | 6/2011 | Murakami | |
| 2011/0198520 | A1 | 8/2011 | Enstedt et al. | |
| 2012/0273311 | A1 | 11/2012 | Beck | |
| 2013/0056317 | A1 * | 3/2013 | Kim | F16F 9/5126<br>188/275 |
| 2014/0000998 | A1 * | 1/2014 | Bismans | F16F 9/18<br>188/284 |
| 2015/0276002 | A1 * | 10/2015 | Eichenmüller | F16F 9/348<br>188/322.15 |
| 2016/0017952 | A1 * | 1/2016 | Kim | F16F 9/3482<br>188/322.13 |
| 2016/0236533 | A1 * | 8/2016 | Inagaki | F16F 9/46 |
| 2016/0312851 | A1 | 10/2016 | Hamers et al. | |
| 2017/0241503 | A1 * | 8/2017 | Ewers | F16F 9/466 |
| 2019/0048965 | A1 * | 2/2019 | Malmborg | F16F 9/348 |
| 2019/0048967 | A1 | 2/2019 | Hoven | |
| 2020/0208709 | A1 * | 7/2020 | De Kock | F16F 9/18 |
| 2022/0412429 | A1 * | 12/2022 | Kim | F16F 9/19 |
| 2024/0159289 | A1 | 5/2024 | Larsson et al. | |
| 2024/0376955 | A1 | 11/2024 | Eston et al. | |

FOREIGN PATENT DOCUMENTS

| | | | |
|---|---|---|---|
| CN | 112815033 | A | 5/2021 |
| CN | 214578532 | U | 11/2021 |
| CN | 214578539 | U | 11/2021 |
| CN | 114165494 | A | 3/2022 |
| CN | 115289165 | A | 11/2022 |
| CN | 219994253 | U | 11/2023 |
| CN | 220396352 | U | 1/2024 |
| CN | 220540419 | U | 2/2024 |
| CN | 117823560 | A | 4/2024 |
| CN | 110360261 | B | 8/2024 |
| CN | 221743102 | U | 9/2024 |
| CN | 120466355 | A | 8/2025 |
| CN | 223331232 | U | 9/2025 |
| CN | 116146647 | B | 10/2025 |
| CN | 121229560 | A | 12/2025 |
| DE | 3807322 | C1 | 7/1989 |
| DE | 102006016473 | A1 | 6/2007 |
| DE | 102007008621 | A1 | 2/2008 |
| DE | 102011102537 | A1 | 2/2012 |
| DE | 102011075792 | B3 | 11/2012 |
| DE | 102012202484 | B3 | 6/2013 |
| DE | 102012204037 | B3 | 9/2013 |
| DE | 102012202485 | B4 | 10/2015 |
| DE | 102015218292 | A1 | 4/2017 |
| DE | 102021202414 | B3 | 6/2022 |
| EP | 2628974 | A2 | 8/2013 |
| EP | 3527841 | A1 | 8/2019 |
| KR | 10-2302543 | | 9/2021 |
| KR | 102435308 | B1 | 8/2022 |
| KR | 102768413 | B1 | 2/2025 |

* cited by examiner

VALVE ARRANGEMENT FOR A SHOCK ABSORBER

CROSS-REFERENCE TO RELATED APPLICATIONS

This application is a U.S. National Phase Application under 35 U.S.C. 371 of International Application No. PCT/EP2022/053118, filed on Feb. 9, 2022, which claims the benefit of European Patent Application No. 21156280.6, filed on Feb. 10, 2021. The entire disclosure of the aforementioned European patent application is incorporated herein by reference.

TECHNICAL FIELD

The invention relates to a valve arrangement for a shock absorber for regulating a damping medium flow between the damping chambers of the shock absorber, and in particular to a valve arrangement for avoiding overshooting.

BACKGROUND

Valve arrangements in vehicles are used for smoothening the ride by absorbing some of the vibrations in the damper without transferring the vibrations to the chassis.

State of the art valve arrangements for use in vehicles such as cars or motorcycles, may have an electrically controlled valve arrangements such as the one shown in EP18157676. In shock absorbers that include pilot valves, a pressure regulator, i.e. a valve arrangement, is used to control a flow of damping medium between a compression chamber and a rebound chamber during a reciprocal motion of a piston in a damping medium filled chamber of the shock absorber. The piston, via a piston rod, is connected either to a wheel or a chassis, whereas the chamber is connected to one of the wheel or chassis that the piston is not connected to. During a compression stroke the piston moves axially in a direction towards the compression chamber and thereby pressurizes the damping medium in the compression chamber. During a rebound stroke, the piston moves axially towards the rebound chamber, i.e. in the opposite direction, and thereby pressurizes the damping medium in the rebound chamber.

The pressure in the flow of damping medium in the shock absorber is controlled by a valve arrangement. Pressure regulators in shock absorbers are usually provided with an axially movable or deflectable valve member, such as a washer, cone or shim that acts against a seat part. The pressure control is achieved by equilibrium or balance of forces, for example equilibrium between a pressure and/or flow force acting on the valve member in one direction and counteracting or opposing forces, such as one or more of a spring force, friction force and pilot pressure force acting on the valve member in the opposite direction. When the piston of the shock absorber moves at a certain speed such that the pressure and/or flow force become greater than the opposing or counteracting forces, the movable valve member is forced away from the seat part, thereby opening a flow passage. Thus, the movable valve member is forced to open at a stroke defined as a function of the flow produced by the pressure acting on the regulating area of the pressure regulator.

A challenge with pilot pressure controlled valve arrangements is to reduce overshoots resulting from the initial pressure increase in the pilot chamber at the initial opening of the valve assembly. Such overshoot typically affects the damping characteristics negatively.

Thus, there is a need for an improved valve arrangement for a shock absorber which alleviates the issues of overshooting.

SUMMARY OF INVENTION

It is an object of the present invention to provide an improved solution that alleviates the mentioned drawbacks with present solutions. Furthermore, it is an object to provide a method for controlling a valve arrangement that also alleviates the above mentioned problem with overshooting in shock absorbers.

The invention is based on the inventor's realization that the above objectives may be achieved by incorporating a valve arrangement having a design and function that allows the pilot chamber volume to initially be increased instead of decreased, problems with overshoots may be alleviated. It has also been shown through testing that such an arrangement reduces noise vibration harshness and therefore increased on-road secondary comfort.

According to a first aspect of the invention, a valve arrangement for a shock absorber is provided. The valve arrangement comprises a valve housing comprising a first and a second port and a pilot chamber being in fluid communication with said first and/or second port. Further a pilot pressure is defined by a hydraulic pressure in said pilot chamber. The arrangement further comprises a main valve member being axially movably along a longitudinal axis in said valve housing and being arranged to interact with a main valve seat of said valve housing in order to restrict a main fluid flow between said first and second ports in response to said pilot pressure acting on said main valve member. The arrangement is characterized in that the main valve member is resiliently loaded in a steady-state position from where it is movable in both directions along the longitudinal axis and is configured to, during an initial pressure increase of the main fluid, move in a direction away from the pilot chamber, so as to increase the volume of the pilot chamber.

The valve arrangement further comprises an axially movable valve seat member arranged axially between the main valve member and the main valve seat, wherein said axially movable valve seat member comprises a first restriction and a cooperating serially arranged second restriction wherein the first orifice of the first restriction and the second orifice of the second restriction are controlled by means of the axial position of the main valve member relative the housing.

Hereby, a soft opening valve arrangement which alleviates overshooting is provided, as the increased volume of the pilot chamber together with the resiliently loaded main valve member will provide a damper that opens softly without an increasing force.

When the main valve member moves away from the pilot chamber to increase its volume, the main valve member is moved out of the steady state position into a pre-tensioned position balanced by the pressure in the pilot chamber.

In one embodiment, the first restriction is arranged upstream relative the second restriction in a main fluid flow during a compression stroke.

In further one embodiment, the first orifice of the first restriction always is smaller than the second orifice of the second restriction in a main fluid flow during a compression stroke. Hereby, the second restriction will be less limiting than the first restriction alone.

In one embodiment, the first restriction is an at least partly circumferential orifice between the movable valve seat member and the main valve seat.

In further one embodiment, the second restriction is arranged radially outside of said first restriction in an at least partly circumferential orifice between the movable valve seat member and the main valve seat.

In one embodiment, the first restriction is radially spaced from the second restriction by means of a circumferential aperture in the movable valve seat member.

In further one embodiment, main valve seat comprises a circumferential aperture aligned with the circumferential aperture in the movable valve seat member.

In one embodiment, the valve arrangement further comprises at least one shim arranged between the main valve member and moveable valve member in an initial flow channel.

In further one embodiment, the at least one shim is configured to deflect in response to a pressure increase in the main fluid flow so as to allow an initial fluid flow between the first and second port.

In one embodiment, the valve arrangement further comprises a third restriction being arranged in series with the second restriction, wherein the third restriction has a constant orifice being independent of the axial position of the main valve member relative the valve housing.

In one embodiment, the third restriction has an orifice in direct connection with the orifice of the first restriction. In one embodiment, the pressure area in the pilot valve member is larger than the pressure area on the main valve member in a closed position. Hereby, while having substantially the same pressure in the pilot chamber as on the opposite side of the main valve member, the main valve member is moved away from the pilot chamber. The area difference generates the pretension of the main valve member. Once the main valve member is moved away from the seat to allow a main fluid flow between the first and second chamber, the pressure will decrease.

In the context of this application, an initial pressure increase means when the pressure of the main fluid from the first port is increased and before any main fluid flow is allowed between the first port and the second port.

In the context of this application, that the main valve member is “arranged to interact with a main valve seat” means that the main valve member’s position relative the main valve seat will restrict a main fluid flow between the first and second port. The main valve member and the main valve seat does not necessarily interact directly, but can (as is shown in figures) be interacting by means of intermediate members such as a shim stack or.

In the context of this application, being “resiliently loaded in a steady-state-position” should be understood as that the member being in such position must be exerted to a force (e.g. fluid pressure) to be moved out of the position, and as the member moves, the resilient load on the member is increased towards the steady-state position.

In one embodiment, the main valve member is configured to, when the pressure of the main fluid flow exceeds a predetermined value being higher than the initial pressure increase, move towards the pilot chamber so as to decrease the volume of the pilot chamber.

Hereby, the movement of the main valve member will have a reversed movement as the pressure increases over the predetermined value. This value can be selected/configured by choosing resilient members, such as shim, shim stacks or coils (or a combination of such) and pressure areas on the main valve member so that a specific pressure from the main fluid will generate the movement as described. Further details to this are explained together with the figures in the detailed description.

In one embodiment, the predetermined value is selected to correspond to a pressure level where the main valve member starts to move to allow a main fluid flow towards the second port.

In yet one embodiment, the initial pressure increases and said predetermined value both occur during a main fluid pressure increase from the first port.

In one embodiment the main valve member is resiliently loaded by a first springing means on a first side of the main valve member and a second springing means on an opposite second side of the main valve member.

Hereby, the springing means (e.g. coil springs and/or shims or resilient member such as flexible materials of any kind) may be selected so that a specific steady-state position on, and/or load is exerted onto, the main valve member.

In yet one embodiment, the first springing means is at least one shim. In one embodiment it is a shim stack. In one embodiment, the second springing means is a coil spring.

In one embodiment, the first springing means is arranged between the main valve member and the main valve seat. Hereby, the springing means may exert a springing force away from the main valve seat.

In yet one embodiment, the main valve member comprises a pilot chamber exposed pressure area being larger than a pressure area on an axially opposite side acting on the main valve member when the main valve member is in said steady-state position.

Hereby, during the initial pressure increase, the main valve member may be move towards the main valve seat so as to increase the pilot chamber volume.

In one embodiment, the main valve member comprises a bypass channel fluidly connecting said first port to said pilot chamber. Hereby, the fluid may be transferred from the first port to the pilot chamber, and the pressure will be substantially equal on both sides of the main valve member. The size of the bypass channel may determine the lagging of the pressure increase in the pilot chamber as compared to the pressure increase from the first port.

In yet one embodiment, the pilot pressure is actively controlled with an electrical actuator such as a solenoid or a step motor. Hereby, the valve arrangement may allow an actively controlled damping characteristics to e.g. a vehicle.

In one embodiment, the pilot pressure is controlled with a failsafe mechanical springing valve when the actuator is fed a current below a threshold value. In one embodiment, the pilot pressure is controlled with a failsafe mechanical springing valve when the actuator is fed a current below 0.2 A. Hereby, if any component fails, the pilot pressure is still controlled, but by means of a mechanical springing valve. Although an electrical component fails, the current is usually not 0, due to rest currents and/or induced currents.

In yet one embodiment, the main valve body moves away from the pilot chamber upon the initial pressure increase with a stroke length of about 0.05-0.5 mm, preferably about 0.1 mm, when it changes direction and moves towards the pilot chamber. Hereby, it is only the initial part of the movement that is reversed, allowing the main valve member to move in the opposite direction after the initial movement.

In one embodiment, the valve arrangement further comprises a calibration spacer for calibrating the maximum load of the first springing means. Hereby, the position at which the springing means, such as a shim, is arranged against may be axially moved to control the maximum load.

According to one aspect of the invention, a shock absorber comprising at least one valve arrangement according to any one of herein described embodiments may be provided. Hereby, a shock absorber alleviating the problems with overshooting may be provided. Such a shock absorber may be implemented on a vehicle such as a car, motorcycle, lorry, truck, or other vehicles with shock absorbers.

According to yet one aspect of the invention, the above mention problems are at least alleviated by means of a method for controlling a damping medium flow between damping chambers of a shock absorber by means of a valve arrangement comprising a valve housing comprising a first and a second port a pilot chamber being in fluid communication with said first and/or second port, wherein a pilot pressure is defined by a hydraulic pressure in said pilot chamber, and a main valve member being axially movably arranged in said valve housing and being arranged to interact with a main valve seat of said valve housing in order to restrict a main fluid flow between said first and second ports in response to said pilot pressure acting on said main valve member. The method comprises the steps of

- resiliently loading a valve member in a steady-state position, and
- moving the main valve member, during an initial pressure increase of the main fluid, in a direction away from the pilot chamber, so as to increase the volume of the pilot chamber.

The method further comprises the subsequent step of moving the main valve member in a direction towards the pilot chamber, so as to subsequently decrease the volume of the pilot chamber, when the pressure of the main fluid flow exceeds a predetermined value being higher than the initial pressure increase. The final step of the method is to, during an active flow control mode restrict the main fluid flow at the first restriction and the cooperating serially arranged second restriction by controlling the first orifice of the first restriction and the second orifice of the second restriction by means of controlling the axial position of the main valve member relative the housing.

The advantages of the method are in large analogous with the advantages described in conjunction with the valve arrangement, being providing a soft opening valve arrangement that alleviates the problems with overshooting and provides a damping characteristics with improved dynamic properties.

Any embodiments or features described in relation to the device may have corresponding functions in the method, and vice versa. Thus, the different aspects of the inventions form a single inventive concept that can be combined in any way, as long as being compatible embodiments.

The invention is defined by the appended independent claims, with some preferred embodiments being set forth in the appended dependent claims, in the following description and in the drawings.

BRIEF DESCRIPTION OF THE DRAWINGS

The invention will in the following be described in more detail with reference to the enclosed drawings, wherein.

DETAILED DESCRIPTION OF EMBODIMENTS

Figure 1:
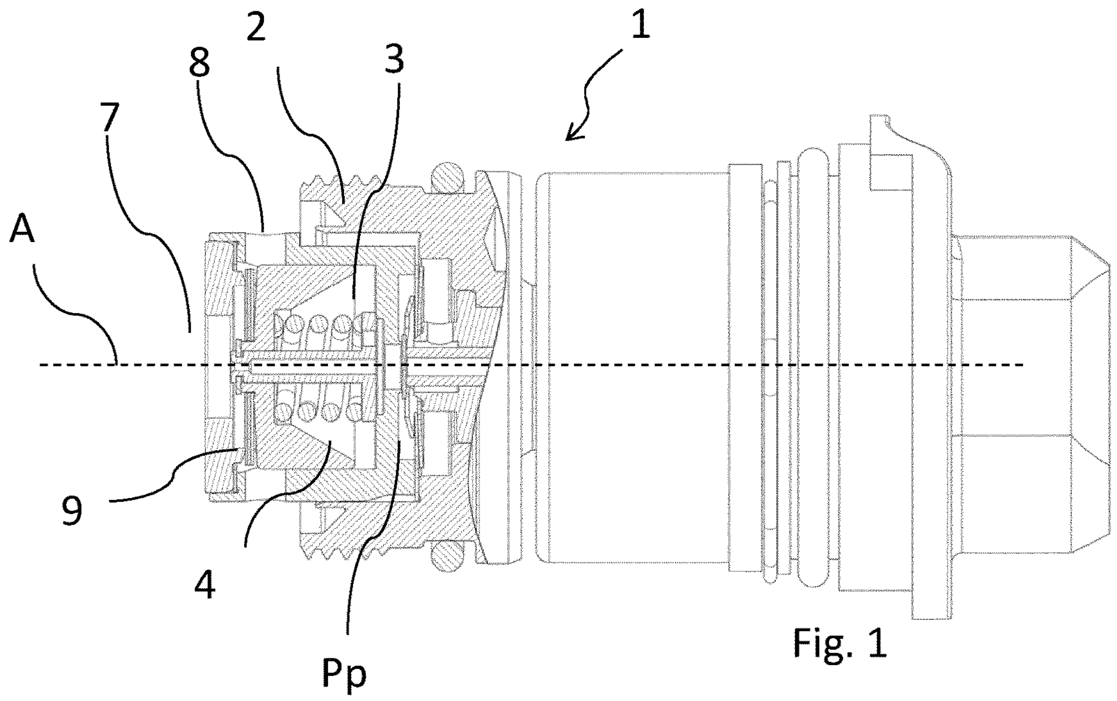
FIG. 1 shows a cross-sectional view of a valve arrangement according to one embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 shows an overview figure in a cross-sectional view of a valve arrangement 1 according to one embodiment of the invention. The valve arrangement comprises a valve housing 2 having a first and second port 7, 8. The valve arrangement is configured to control a main fluid flow between the first 7 and second 8 port. Further, the figure illustrates that that the valve arrangement comprises a pilot chamber 3 being in fluid communication with the first port 7 and the second port 8. The pilot chamber is adapted to keep the fluid in a pilot pressure PP which is defined by a hydraulic pressure in said pilot chamber. Moreover, the arrangement comprises a main valve member 4 being axially movably along a longitudinal axis A going through a central portion of the valve housing 2. The main valve member is configured to interact with a main valve seat 9 of the valve housing so as to restrict a main fluid flow 21 (illustrated in FIG. 5*c*) between the first and second ports 7, 8. The main fluid flow is regulated in response to the pilot pressure PP acting on the main valve member.

Moreover, the main valve member 4 is resiliently loaded in a steady-state position (as shown in e.g. FIGS. 5 and 7) from where it is movable in both directions along the longitudinal axis (A). In the steady state position the main fluid flow cannot pass between the first and second port.

Figure 2A:
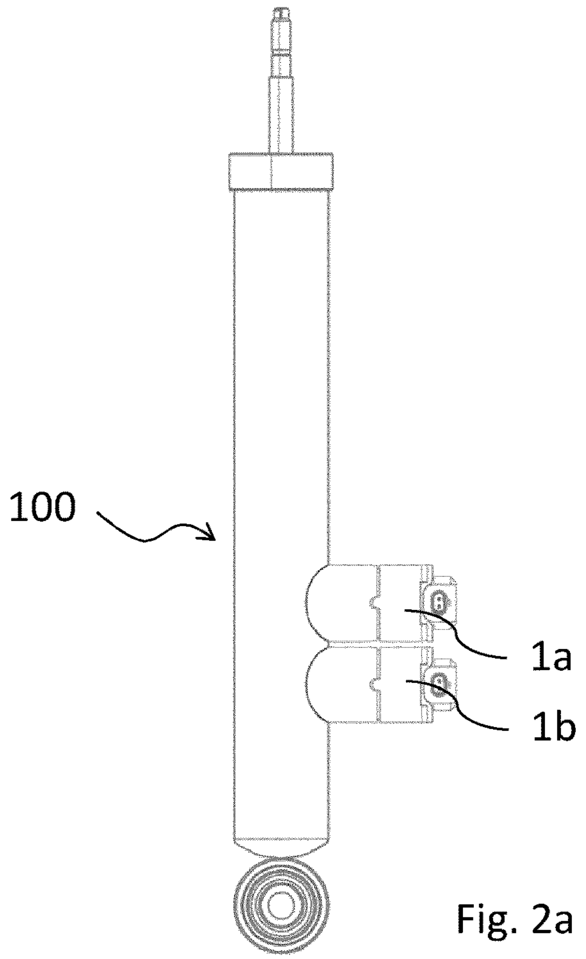
FIG. 2*a* shows a side view of a shock absorber having two valve arrangements.
Figure 2B:
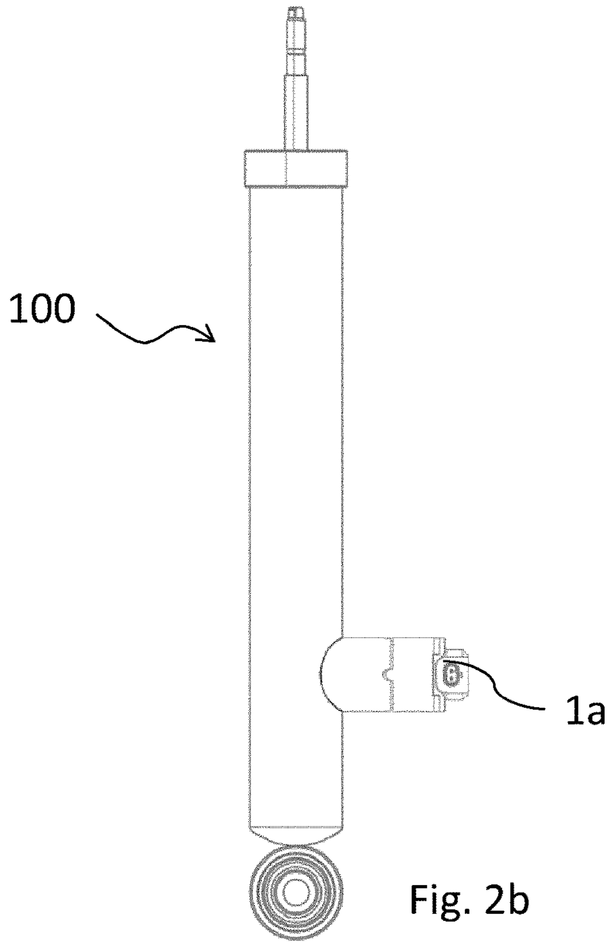
FIG. 2*b* shows a side view of a shock absorber having a single valve arrangement.

FIG. 2*a* and FIG. 2*b* show a side views of shock absorbers 100 having two valve arrangements and one valve arrangement, respectively. In FIG. 2, the two valve arrangements would typically be used by having one of the valve assemblies fluidly coupled to the fluid flow in the compression stroke and the other valve assembly fluidly couple to the fluid flow in the rebound stroke. Both 1*a* and 1*b* may be valve arrangements as described herein, with a bidirectional main valve member, but in some embodiments the valve arrangement may be combined with another type of valve arrangement. In FIG. 2*b* the valve arrangement 1*a* may be a 2-way valve arrangement for handling flow in both directions, i.e. compression stroke and rebound stroke fluid flows.

Figure 3A:
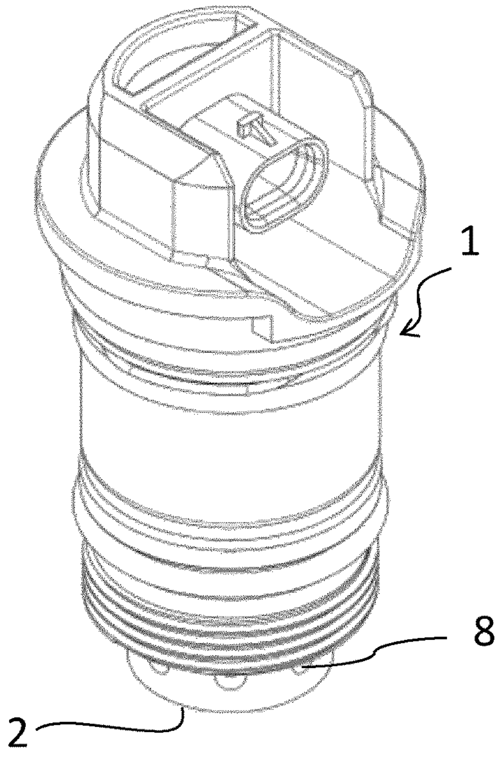
FIG. 3*a* shows an overview of the valve arrangement according to one embodiment of the invention.
Figure 3B:
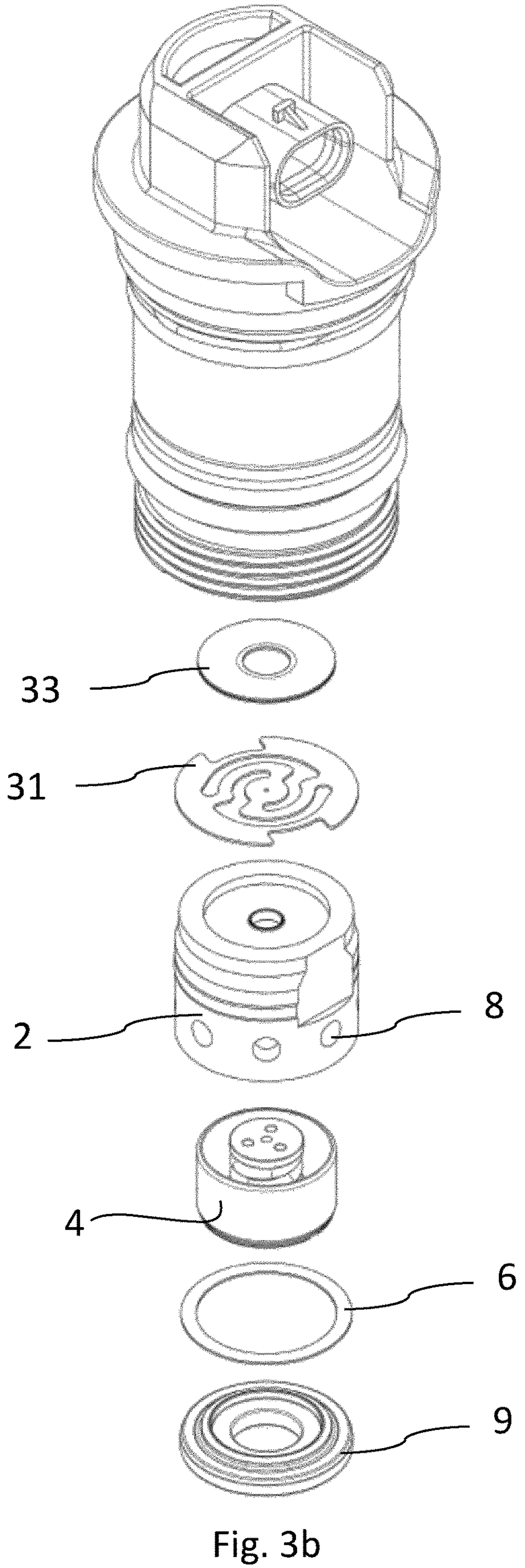
FIG. 3*b* shows an exploded perspective view of the valve arrangement according to one embodiment of the invention.

FIGS. 3*a* and 3*b* show an overview of the valve arrangement 1 and an exploded perspective view of the valve arrangement, respectively. The valve arrangement comprises a cylindrical valve housing 2 with a first port 7 (not shown due to perspective view) and the second port 8. The second port in this embodiment comprises several apertures, so that the fluid flow can flow radially outwards around the circumference of the cylindrical shape.

The arrangement further comprises a failsafe shim 33 for functioning as a check valve together with a pilot shim spring 31 functioning as the seat in the check valve. In this embodiment, the shim spring 31 comprise several springing portions for creating different spring forces at different strokes of an actuator 5 acting on said spring. This is most easily understood in the cross-sectional views of FIGS. 5*a*-5*c*.

The exploded view further illustrates the cylindrical shape of the main valve member as well as the calibration washer 6 and seat portion 9.

Figure 4A:
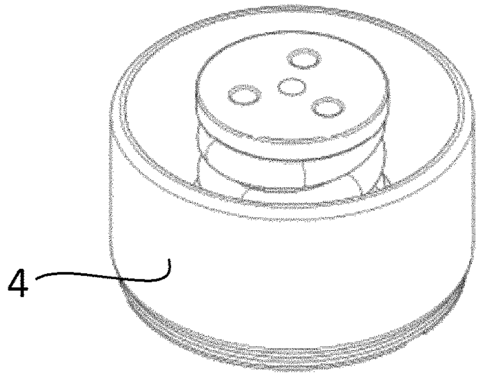
FIG. 4*a* shows an overview of the main valve assembly according to one embodiment of the invention.
Figure 4B:
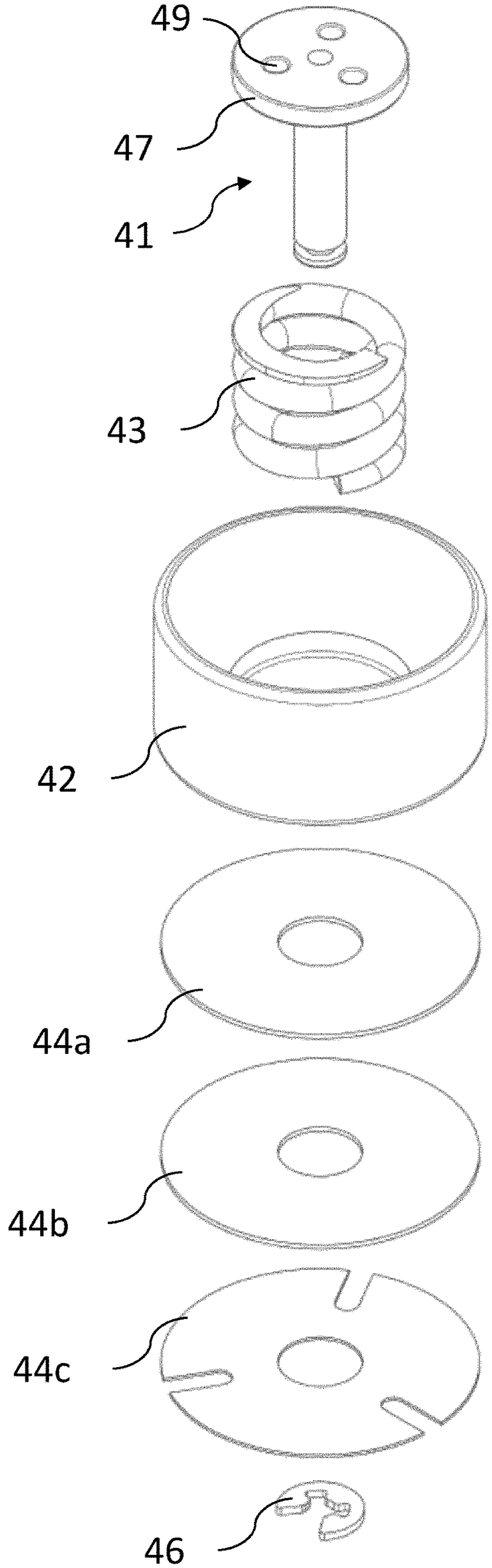
FIG. 4*b* shows an exploded perspective view of the main valve assembly according to one embodiment of the invention.

The main valve body is further illustrated in detail in FIGS. 4*a* and 4*b*, in which 4*a* shows an overview of the main valve assembly, and FIG. 4*b* shows an exploded perspective view of the main valve assembly. Again, these figures are to be understood as possible embodiments of the invention and are not necessarily the only way of carrying out the inventive concept which is defined in the claims.

The main valve member 4 comprises a central body 41 having an elongated cylindrical shape with a head portion 47 having a larger circumference than the rest of the central body. The head portion 47 comprise apertures 49 for allowing the damping fluid to flow between an upper portion and a lower portion of the pilot chamber 3. A coil spring 43 is placed around the central body 41 and is sandwiched between the central body's head portion 47 and the main valve member's outer body 42. This coil spring is used for preloading the main valve member in a direction axially away from the pilot chamber 3.

FIG. 4*b* further illustrated a shim stack having three shims 44*a*, 44*b*, 44*c* and a locking member in the form of a lock washer 46 for locking the central body 41 so that the shim stack is sandwiched between the lock washer 46 and the outer body 42. The shim stack may comprise more or fewer shims, with a variation of thickness and slits, so as to e.g. adjust its springing force.

Figure 5A:
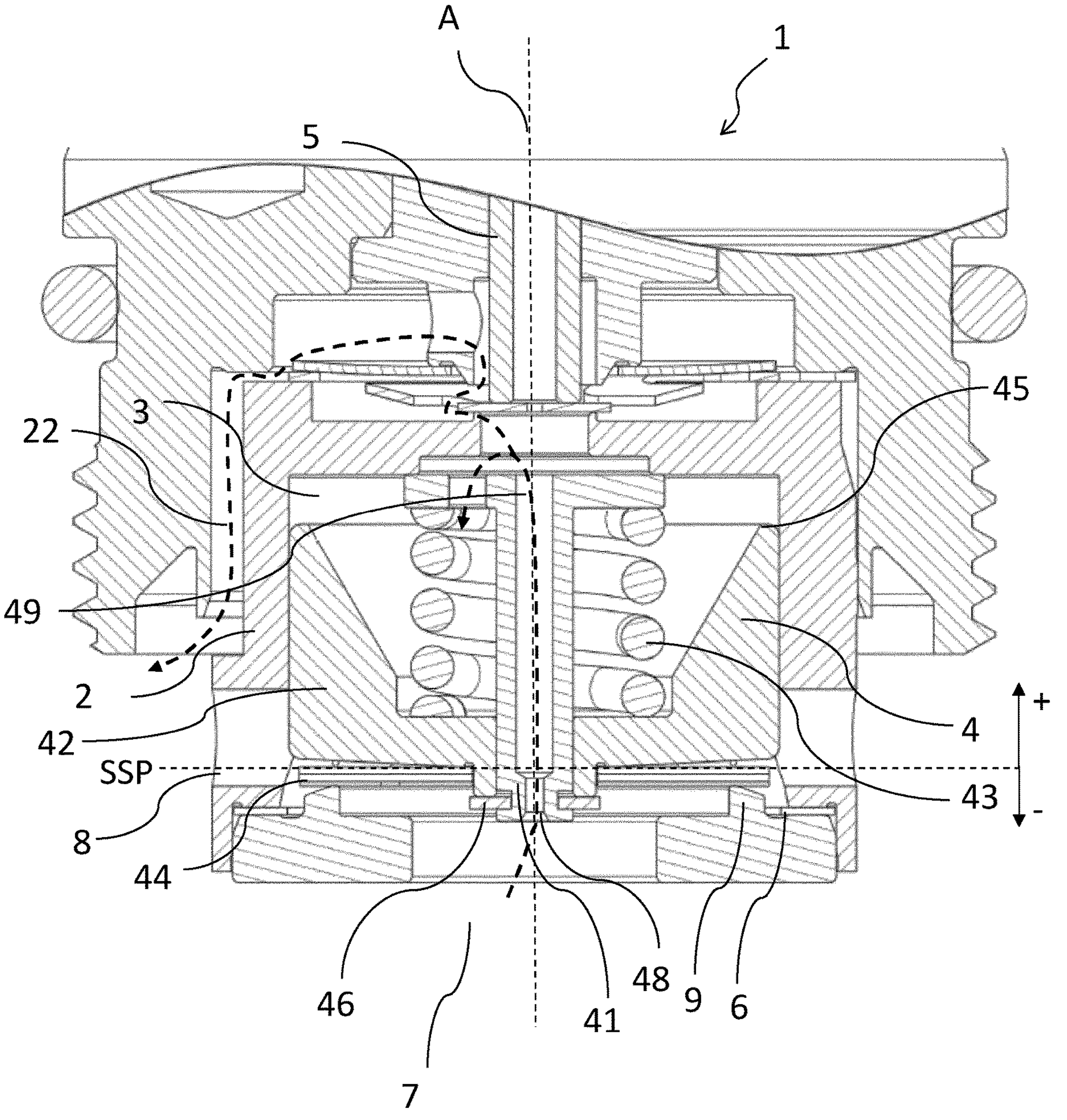
FIG. 5*a*-5*c* show cross sectional views of the valve arrangement according to one embodiment of the invention in different positions.
Figure 5B:
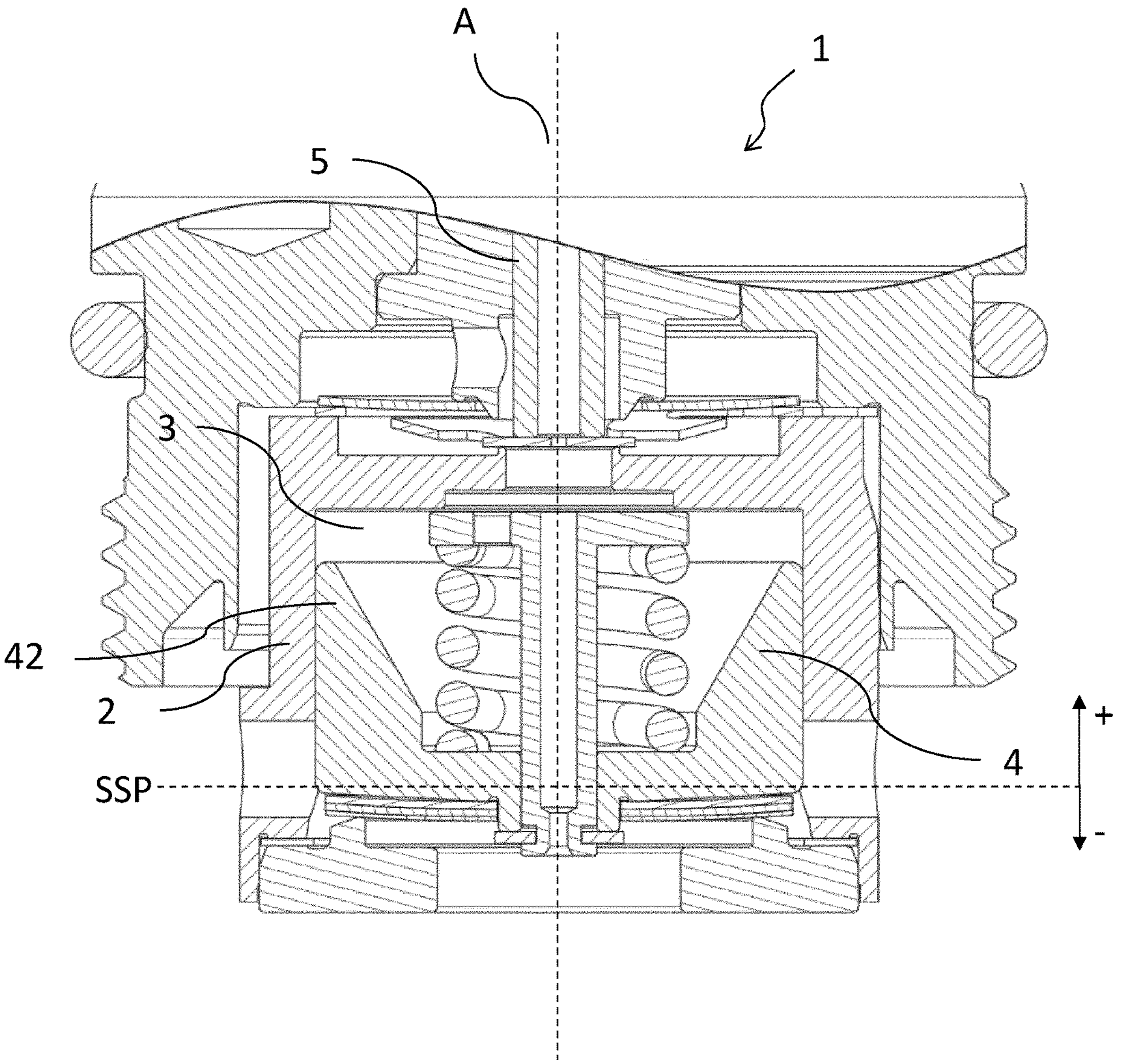
Figure 5C:
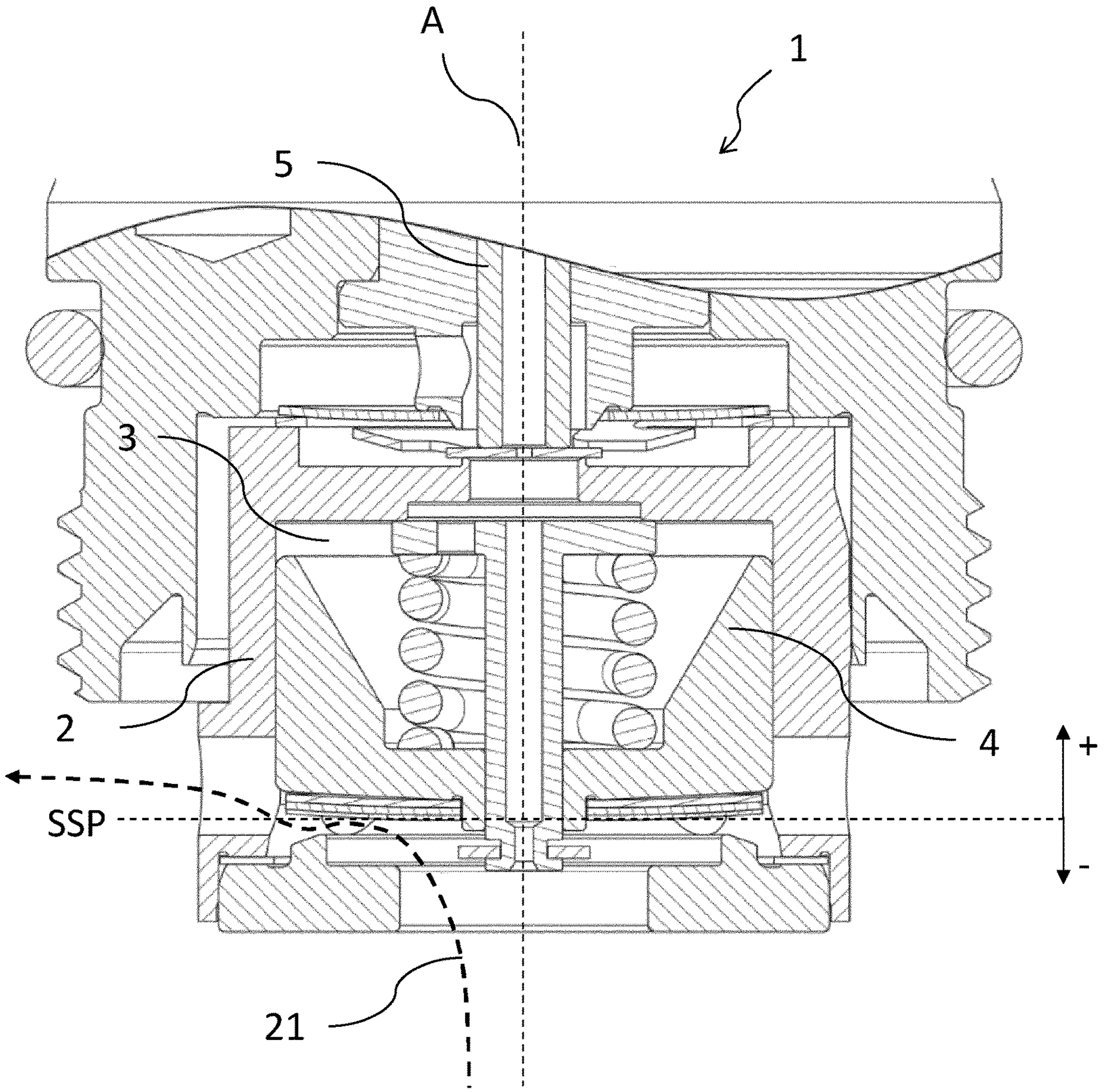

FIG. 5*a*-5*c* show cross sectional views of the valve arrangement according to one embodiment of the invention, where the main valve member is in different axial positions.

In FIG. 5*a*, the main valve member is in its steady-state position SSP. In this position the coil spring member 43 may preload the main valve member towards the main valve seat 9, and the shim stack 44 (comprising shims 44*a*, 44*b*, 44*c*) preloads the main valve member way from the main valve seat 9. It is also possible that the coil spring member and or the shim stack 44, does not preload the main valve member until the main valve member moves out from its steady state position.

In FIG. 5*a* it is also illustrated how the actuator 5 acts on the pilot shim spring 31 to control the pilot pressure. The actuator 5 may be coupled to a solenoid or a step motor, so that the position or force of the actuator may be controlled by means of software.

The axial position of the main valve member 9 is determined by the thickness of the calibration washer 6. The calibration washer thereby also determines the preload of the shims stack 44.

Outer body 42 comprises a bypass channel 48 allowing a bypass flow 22 between the first port 7 and the pilot chamber 3. The size of the bypass channel in this layout determines the lagging of the pressure increase in the pilot chamber as compared to the pressure increase in the first port.

There are several moving parts that are dependent on a number of springing means and the hydraulic pressure. Once the coil spring 43 preload is reached, a relative movement between the outer body 42, shim-stack and the central body 41 occur, where the outer body moves in positive X-direction. This is illustrated in FIG. 5*c*. However, before that, a relative movement in the negative X-direction occurs between main valve's outer body 43 and the valve housing 2 when shim-stack elastically deforms in response to the increased hydraulic pressure. This creates an inverting movement where the displacement from the main valve member initially expands the volume in the pilot chamber.

In FIG. 5*b*, the predetermined pressure is reached and the main valve member's 4 outer body 42 is moved in the negative axial direction, i.e. down in the figure, away from the pilot chamber and towards the main valve seat 9. This occurs during an initial pressure increase of the main fluid, so as to increase the volume of the pilot chamber 3.

The valve arrangement may be used in system pressures of 1-400 bar. Depending on the application the predetermined value may be chosen so as to reduce the overshoot in the specific application.

When moving onto FIG. 5*c*, the hydraulic pressure has increased further, so that the coil spring 43 preload is reached and outer body 42 moves in positive X-direction and a main fluid flow 21 is allowed between the first port 7 and the second port 8.

The pressure area on the outer body 42 is larger in the pilot chamber than on the opposite side of the outer body 42. Thereby, a pressure in the pilot chamber will create a preload of the shim stack 44 via the outer body 42.

It is the bypass flow passage 48 in the outer body 42 that allows pressurizing of the main valve member towards the first springing means.

Figure 6A:
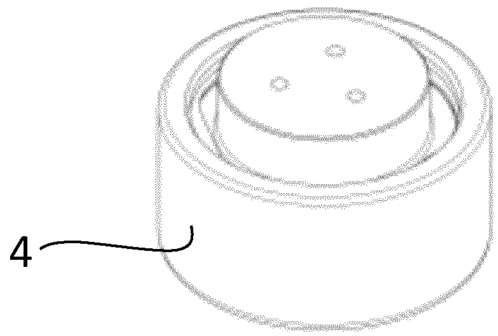
FIG. 6*a* shows an overview of the main valve assembly according to one embodiment of the invention.
Figure 6B:
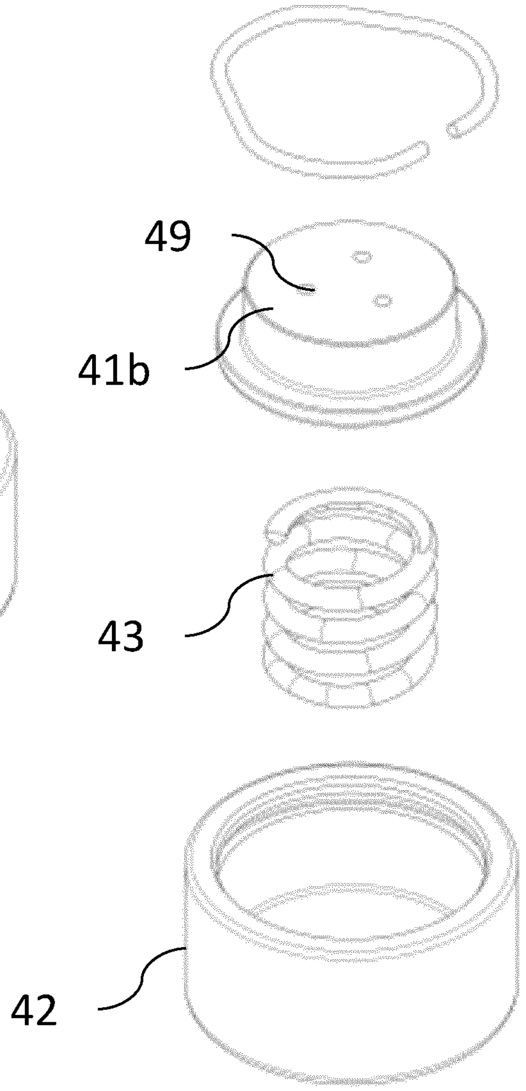
FIG. 6*b* shows an exploded perspective view of the main valve assembly according to one embodiment of the invention.
Figure 7:
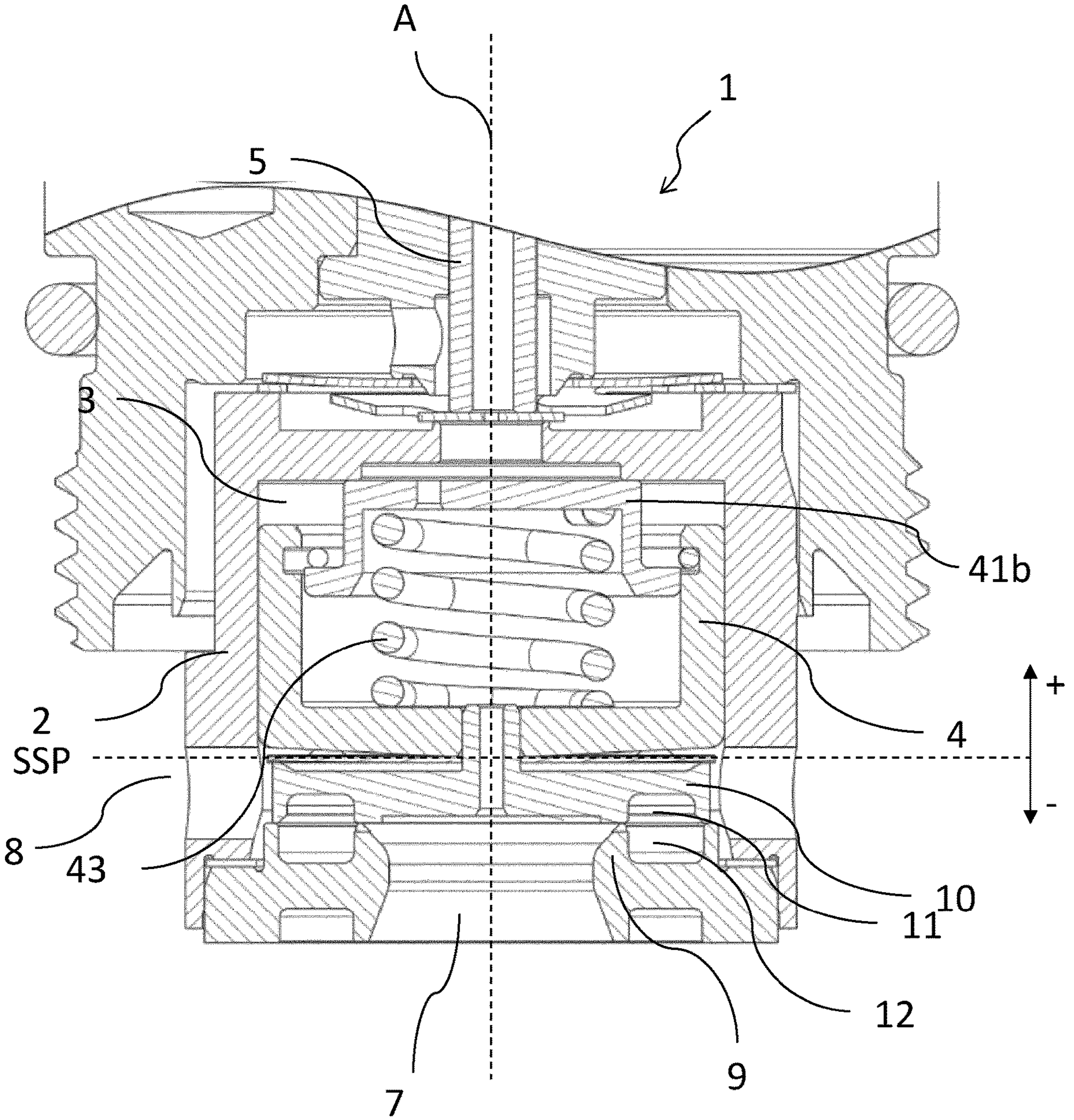
FIG. 7 shows a cross sectional view of the valve arrangement according to one embodiment of the invention.

FIGS. 6*a*, 6*b* and 7 illustrates an embodiment of the invention where a movable valve seat member 10 is used. The moveable valve seat 10 comprises a first circumferential aperture 11, and the seat portion 9 also comprises a circumferential aperture 12, which cooperates with the first circumferential aperture 11. Together the two circumferential apertures 11 and 12 creates a soft opening functionality of this valve.

In FIGS. 6*a*, 6*b* and 7 the central body 42 has been replaced by a top body 41*b*, having an aperture to house the coil spring 43 and holding it into place. The functionality of the embodiment in FIGS. 6-7 are the same as described above, but the embodiment is included to illustrate that the invention may be designed in different ways without departing from the inventive concept.

Figure 8:
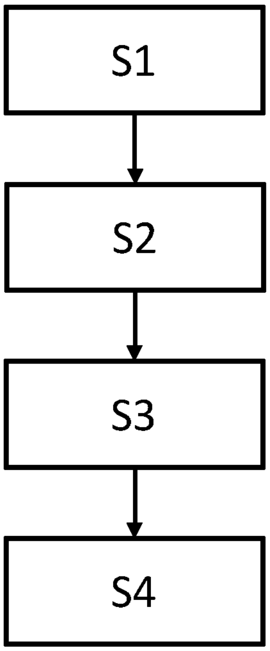
FIG. 8 shows a flow diagram of the method for controlling the damping fluid flow according to one embodiment.

Further, FIG. 8 shows a simple flow diagram of the method for controlling the damping fluid flow according to one embodiment. The method is used for controlling the damping medium flow between damping the chambers 7, 8 of a shock absorber 100 by means of a valve arrangement 1 as described in any one of the embodiments above. The method comprises the steps of resiliently loading S1 a valve member 4) in a steady-state position. As explained above, this may be done by for example positioning the main valve member between to springing means, such as coil springs or shims or a combination thereof. In the most illustrated examples herein a shim or shim stack is used as the first springing means for creating a load away from the main valve seat, and a coil spring to create the load towards the main valve seat.

As a second step, the method comprises moving S2 the main valve member 4, during an initial pressure increase of the main fluid, in a direction away from the pilot chamber 3, so as to increase the volume of the pilot chamber. This may be achieved in a number of ways, but by doing so the damping medium may be controlled without the typical overshooting problems as shown in prior art.

The third step is carried out by moving S3 the main valve member 4 in a direction towards the pilot chamber 3, so as to subsequently decrease the volume of the pilot chamber, when the pressure of the main fluid flow exceeds a predetermined value being higher than the initial pressure increase.

Thereafter, during an active flow control mode the fourth step of restricting S4 the main fluid flow at a first restriction R1 and a cooperating serially arranged second restriction R2 by controlling the first orifice OR1 of the first restriction and the second orifice OR2 of the second restriction R2 by means of controlling the axial position of the main valve member 4 relative the housing 2, is carried out. This step if preferably carried out by energizing e.g. a solenoid or a step motor that controls the axial position of the main valve member 4. The axial position may be controlled by controlling the solenoid or step motor in combination with the pilot pressure acting on the main valve member 4.

As is apparent for the person skilled in the art, functionalities described in relation to the apparatus herein may also be incorporated in the method. Examples may be that a bypass flow passage 48 described in the outer body 42 also disclosed the step of pressurizing of the main valve member towards the first springing means by a bypass flow.

Figure 9:
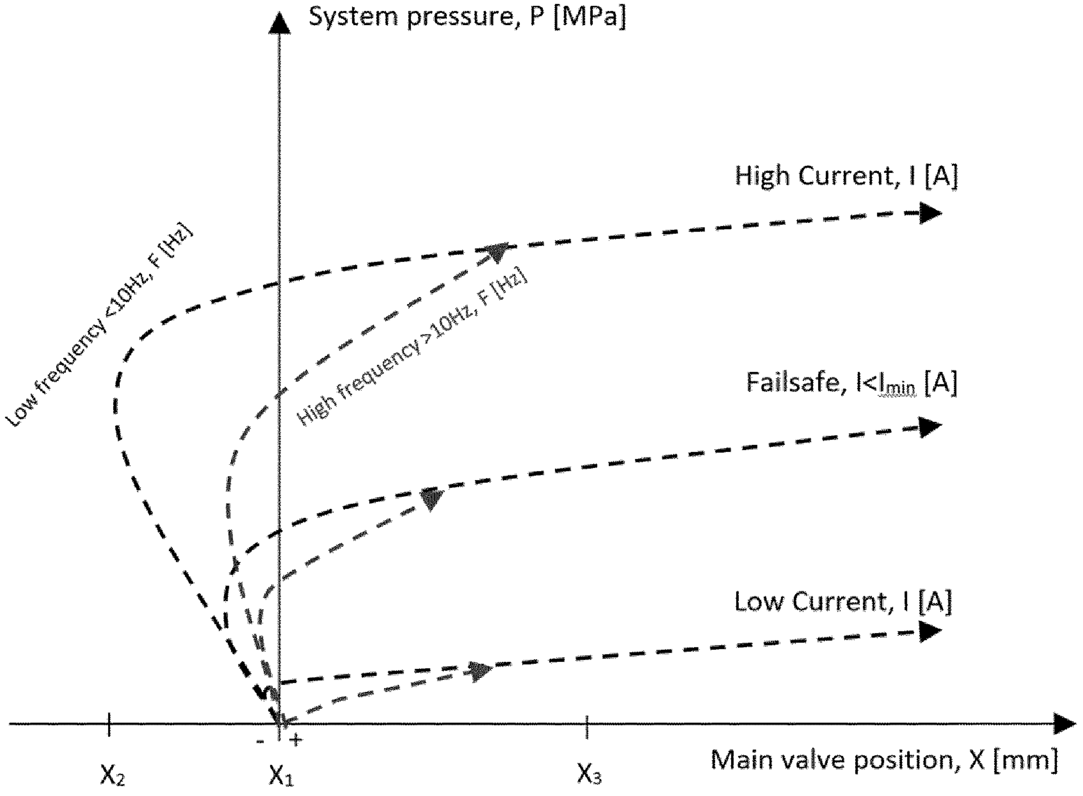
FIG. 9 shows a graph of the main valve members axial position in relation to the system pressure.
Figure 10:
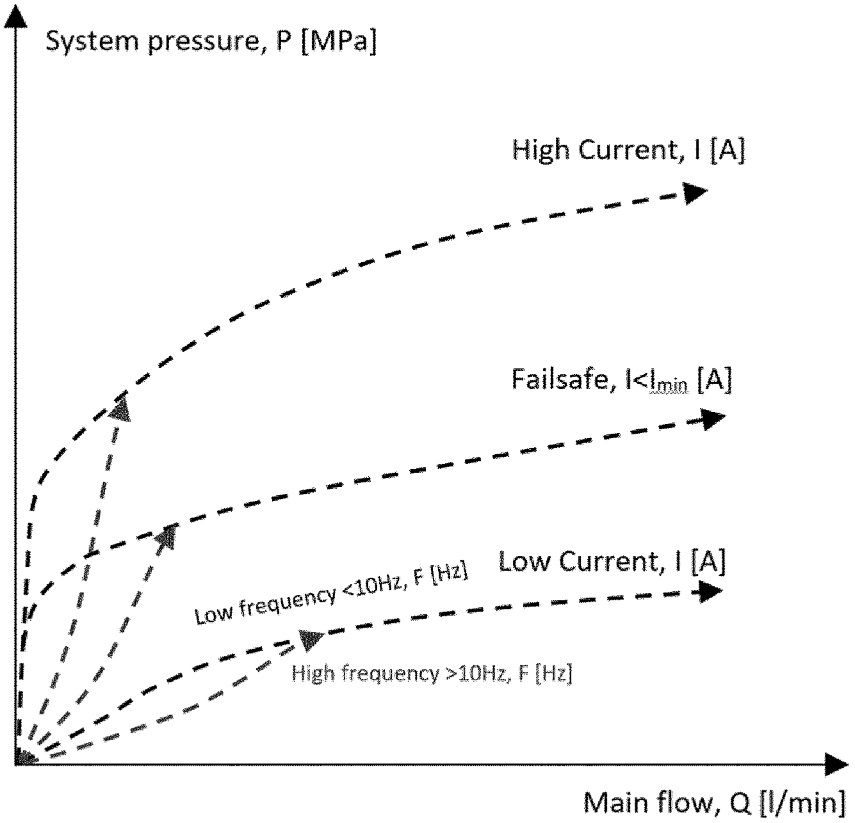
FIG. 10 shows a graph of the main fluid flow in relation to the system pressure.

Finally, FIGS. 9-10 are two graphs explaining the positions and fluid flow in relation to a system pressure in a hydraulic shock absorbers as described herein. As a starting point, shock absorbers can be generalized to handle two types of movements. It is movement of the vehicle chassis, which typically are movements within the frequency of 1-3 Hz. Secondly, there are unevenness from the road which typically has a higher frequency such as 10-200 Hz.

In FIGS. 9 and 10 the valve position and the main fluid flow is illustrated in three scenarios with low frequency (also called a static level, being substantially less than 10 Hz) and three scenarios with high frequency (also called dynamic level, being substantially more than 10 Hz). The three scenarios are high current, fail safe and low current being fed to the solenoid controlling the actuator 5.

Starting with FIG. 9 it shows a graph of the main valve members axial position in relation to the system pressure. From this figure, it is clear that the main valve member first moves from a first position X1 corresponding to the steady state position of the main valve member in a negative x-direction towards a second position X2, and then turning towards a positive direction once the system pressure increase beyond a pre-determined level. As is explained in these graphs, the predetermined level depends on the current supplied to the solenoid and thereby the actuator acting on the pilot pressure. When the movements that are to be absorbed in a shock absorber are high frequency movements, the main valve member will not have time to move as far towards the negative (X2) position before it turns an moves in the positive direction in order to open for the main fluid flow.

As illustrated in FIG. 10, the three scenarios result in a main flow Q which is basically zero in the beginning of the system pressure increase. The system pressure when the fluid flow begins is dependent on the current fed to the solenoid controlling the actuator force. As can be seen from FIG. 10, the problem with overshooting that usually occurs during high frequency damping is radically alleviated. Instead of the overshooting problem, due to the inversed initial movement of the main valve member the main fluid flow will never overshoot, instead the flow will be slightly lower than during lower frequencies in low system pressure levels.

Thus, when the components of the damper are not moving fast enough, the pressure in prior art is usually higher, i.e. creating overshooting. However, with this design, the pressure will be lower when frequency is increased.

Figure 11A:
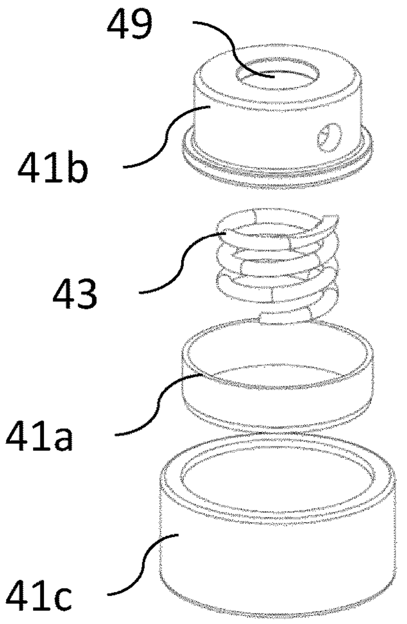
FIG. 11 *a* shows an exploded perspective view of the main valve member according to one embodiment of the invention.
FIG. 11*b* shows an exploded perspective view of the main valve assembly according to one embodiment of the invention.

FIG. 11*a* shows an exploded perspective view of the main valve member according to one embodiment of the invention. The main valve body comprises an outer body 41*c*, and intermediate sleeve 41*a* and an inner top body 41*b*. The inner top body 41*b* houses a coil spring 43 which bias the main valve member as explained above.

Figure 11B:
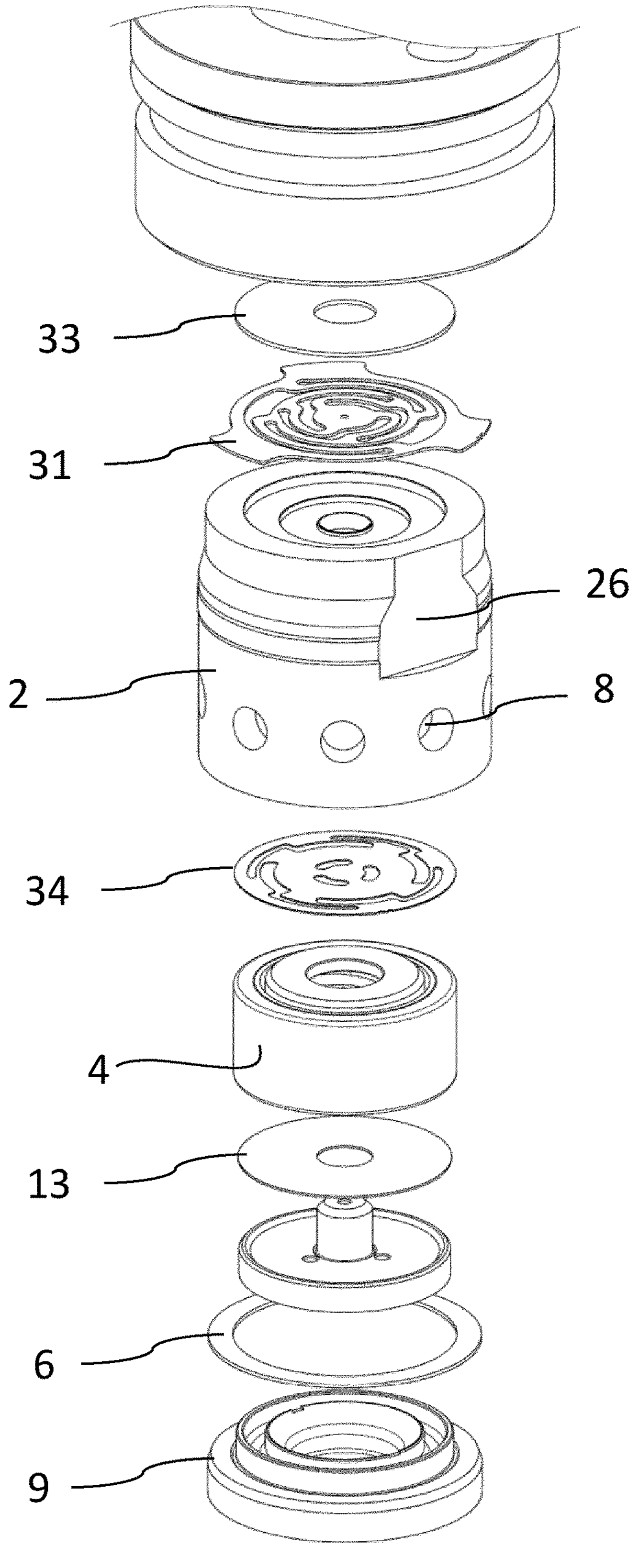

FIG. 11*b* shows an exploded perspective view of the main valve assembly according to one embodiment of the invention. The assembly is in large the same components as described in relation to FIG. 3*b*, but with the main difference that the moveable valve member is included. The arrangement comprises the already mentioned failsafe shim 33 which functions as a check valve together with a pilot shim spring 31, wherein the pilot shim spring functioning as the seat in the check valve.

In the illustrated embodiment, the shim spring 31 comprise several springing portions for creating different spring forces at different strokes of an actuator 5 acting on said spring. This is most easily understood in the cross-sectional views of FIGS. 12*a*-12*c*, with the same logic as has been used for FIGS. 5*a*-5*c* above.

The valve assembly further comprises a biasing shim 34 for biasing the main valve member 4 it is in an axial position close to a top portion of the valve housing 2, in a downwards direction. The biasing shim comprises apertures to allow fluid flow through it.

The exploded view further illustrates the cylindrical shape of the main valve member 4. Further the shim, or initial bypass shim 13, is illustrated between the main valve member 4 and the movable seat valve 10. Finally, the calibration washer 6 and seat portion 9 are illustrated in the lowest portion of the figure. The components are coaxially arranged.

Again, these figures are to be understood as possible embodiments of the invention and are not necessarily the only way of carrying out the inventive concept which is defined in the claims.

Figure 12A:
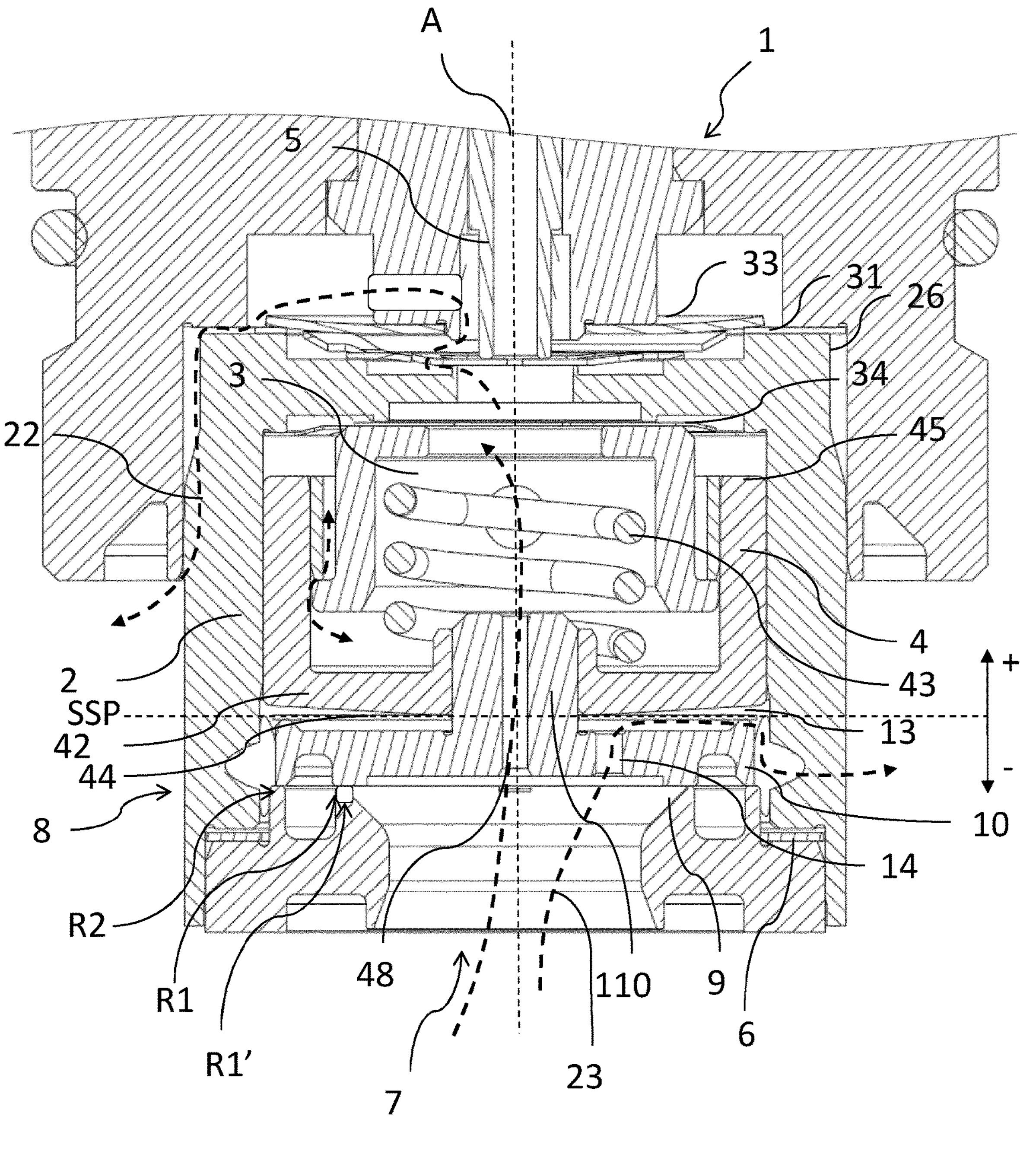
FIG. 12*a*-12*d* show cross sectional views of the valve arrangement according to one embodiment of the invention in different positions.
Figure 12B:
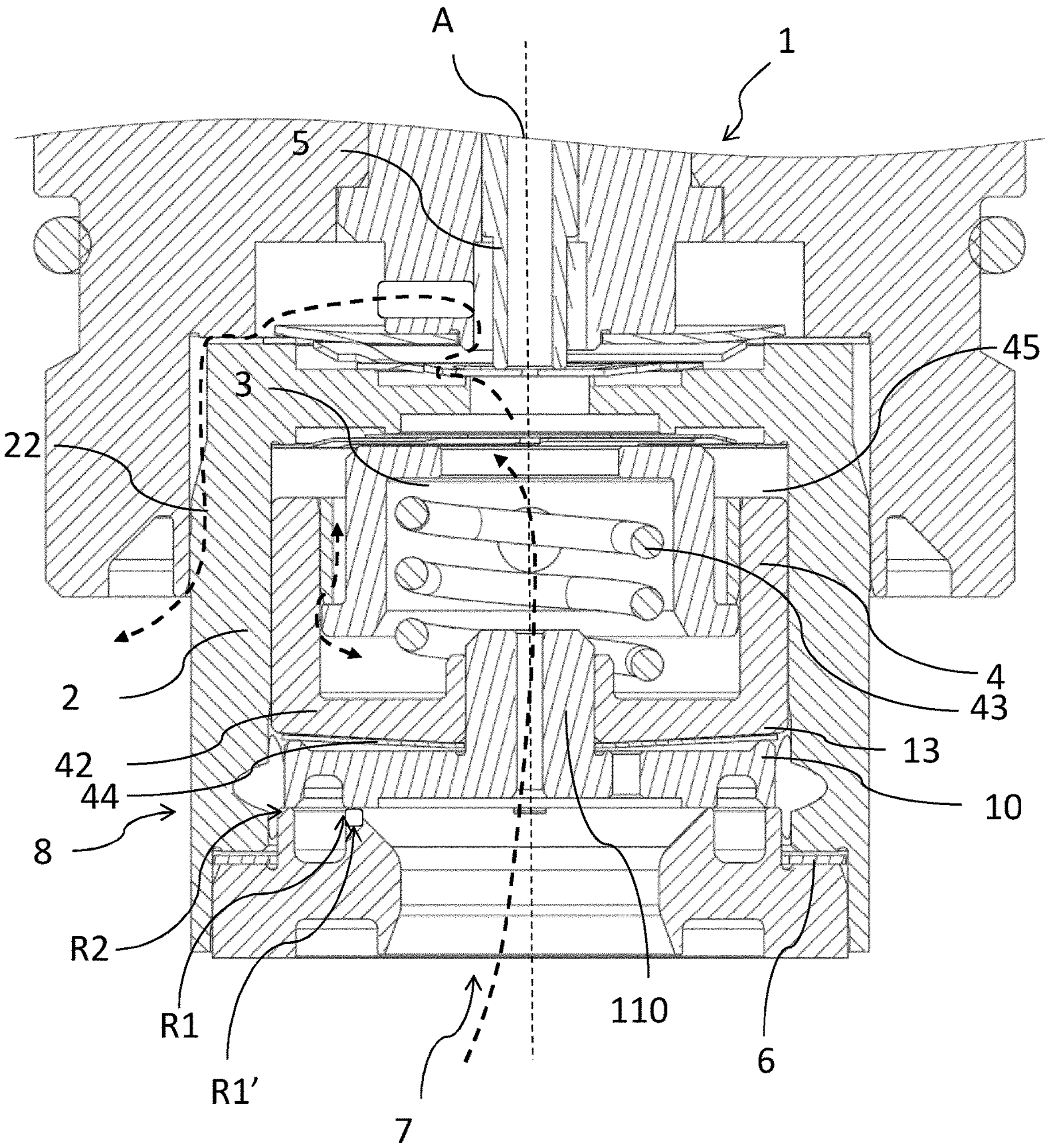
Figure 12C:
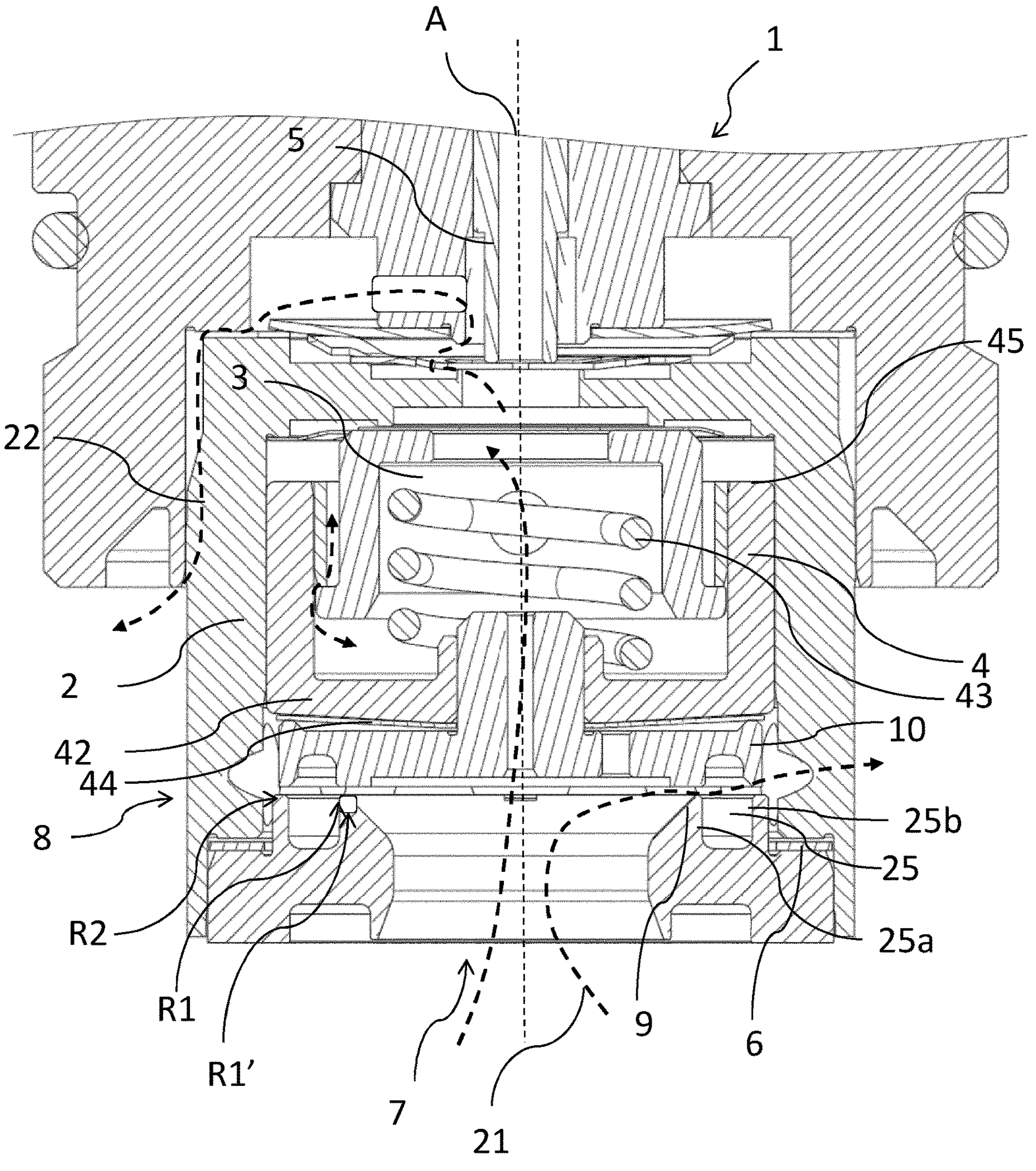

FIG. 12*a*-12*c* show cross sectional views of the valve arrangement according to one embodiment of the invention in different positions. FIG. 12*a* corresponds to the state/position discussed in FIG. 5*a*, i.e. the steady state position. FIG. 12*b* corresponds to the state/position discussed in FIG. 5*b*, which is the initial pretensioned state where the pilot chamber is expanded due to the movement of the main valve member towards the seat (away from the pilot chamber). Finally, FIG. 12*c* corresponds to the state/position discussed in FIG. 5*c*, which is the state in which the main fluid flow 21 is restricted between the valve seat and the moveable valve seat member 10.

Any details discussed in relation to the FIGS. 5*a*-5*c* are applicable also on FIGS. 12*a*-12*c*.

In FIG. 12*a*, the main valve member 4 is in its steady-state position SSP. In this position the biasing shim 34 may preload the main valve member 4 towards the movable valve seat member 10 (and thereby also towards the main valve seat 9). From the other side, at least one shim or a shim stack 44 (above illustrated as comprising shims 44*a*, 44*b*, 44*c*) preloads the main valve member away from the main valve seat 9 via the moveable valve seat 10. It is also possible that the coil spring member and or the shim stack 44, does not preload the main valve member until the main valve member moves out from its steady state position.

FIG. 12*a* also illustrates how the actuator 5 acts on the pilot shim spring 31 to control the pilot pressure. The pilot shim spring 31 in FIGS. 11-12*c* is further developed from the shim spring as illustrated in the earlier embodiments and comprises a third springing function. The actuator 5 may be coupled to a solenoid or a step motor, so that the position or force of the actuator may be controlled by means of software, as mentioned above.

One main difference in the embodiment in FIGS. 12*a*-12*c* is that this embodiment comprises an initial channel 14, which allows an initial bypass flow to flow from the first port 7 to the second port 8 via an initial bypass shim 13. The shim 13, or "initial bypass shim", is configured to allow a small initial bypass flow 23 in response to very small pressure increase at the first port 7. The main part of said initial bypass flow occurs before the pilot chamber volume is increased due to the increased pressure as discussed above. Thus the "very small" pressure increase is an increase from 0 up to the predetermined value where the main valve member moves away from the pilot chamber to increase the volume of the chamber. Once the main valve member bottoms out, as displayed in FIGS. 12*b* and 12*c*, the shim 13 is substantially closed as the shim 13 is clamped between the main valve member 4 and the movable valve seat member 10. However, there may be some flow even when the shim 13 is clamped between the main valve member 4 and the movable valve seat member 10. Since the shims has substantially no mass to move, the movements of the shims may be much faster than displacing a valve member axially in the valve arrangement.

The axial position of the main valve member 9 and the movable valve seat member 10 is determined by the thickness of the calibration washer 6. The calibration washer 6 thereby also determines the preload of the at least one shim or shims stack 44.

The moveable seat member 10 comprises a central portion 110 with is sized and formed to mesh with a central hole in the main valve member 4. The central portion protrudes upwards into the main valve member 4.

Alternatively, the main valve member may instead comprise a central portion which is sized and configured to mesh with a corresponding aperture in the movable valve seat member 10. Such a central portion of the main valve member 4 would then preferably protrude axially towards the movable valve seat member, i.e. in the specific embodiment towards the first port 7. The meshing portions holds the parts coaxially arranged.

The valve assembly comprises a bypass channel 48 allowing a bypass flow 22 between the first port 7 and the pilot chamber 3. The size of the bypass channel in this layout determines the lagging of the pressure increase in the pilot chamber as compared to the pressure increase in the first port. The bypass flow 22 flows from the first port, into the pilot chamber, and further between in the outer portion of the valve housing at a bypass aperture 26 in the other surface of the valve housing, and out to the volume of the second port.

The cross-section cut in FIGS. 12*a*-12*c* do not fully illustrate the second port 8 through the valve housing 2. The second port is made of several opening circumferentially spread along the valve housing, as is also illustrated in FIG. 11*b*. Likewise, the initial channel 14 is only pointed at in a specific opening of the moveable seat member 10, but there may be several openings that together form the initial channel 14.

In FIG. 12*b*, the predetermined pressure is reached in the first port and the main valve member's 4 outer body 42 is moved in the negative axial direction, i.e. down in the figure, away from the pilot chamber and towards the movable valve seat member 10 and the main valve seat 9. This occurs during an initial pressure increase of the main fluid, so as to increase the volume of the pilot chamber 3, as has been explained above.

When moving onto FIG. 12*c*, the hydraulic pressure has increased further, so that the coil spring 43 preload is reached and outer body 42 moves in positive X-direction (away from the main seat 9, and upwards in the figure) and a main fluid flow 21 is regulated between the first port 7 and the second port 8 via the first restriction R1 and serial cooperating second restriction R2.

The movable valve seat member 10 and/or the main seat member 9 comprises a circumferential aperture 25, having a radial inner wall 25*a* and a radial outer wall 25*b*. The aperture may be formed in the valve seat member 9, or in the moveable valve seat member 10 or in both of them, with two aligned apertures together forming the circumferential aperture.

In connection with the radial inner wall 26 (in either of, or both of, the movable valve seat member 10 and the main seat 9) there is another aperture forming a third restriction R1'. The third restriction R1' allows the damping fluid to enter the circumferential aperture 25 so as to pressurize the movable valve seat member 10 in response to a pressure in the first port 7.

In the state in FIG. 12*c*, a regulated main fluid flow 21 is allowed from the first port 7 to the second port 8, and is restricted by the first restriction R1 plus the fourth restriction R1' first (upstream, closest to the first port) and then restricted by the second restriction R2 downstream of the first restriction R1.

At the radial inner wall 25*a* the movable valve seat member 10 and the main valve 9 forms a part of the first restriction R1 and at the radial outer wall 25*b* the movable valve seat member 10 and the main valve seat 9 forms the second restriction R2.

Figure 12D:
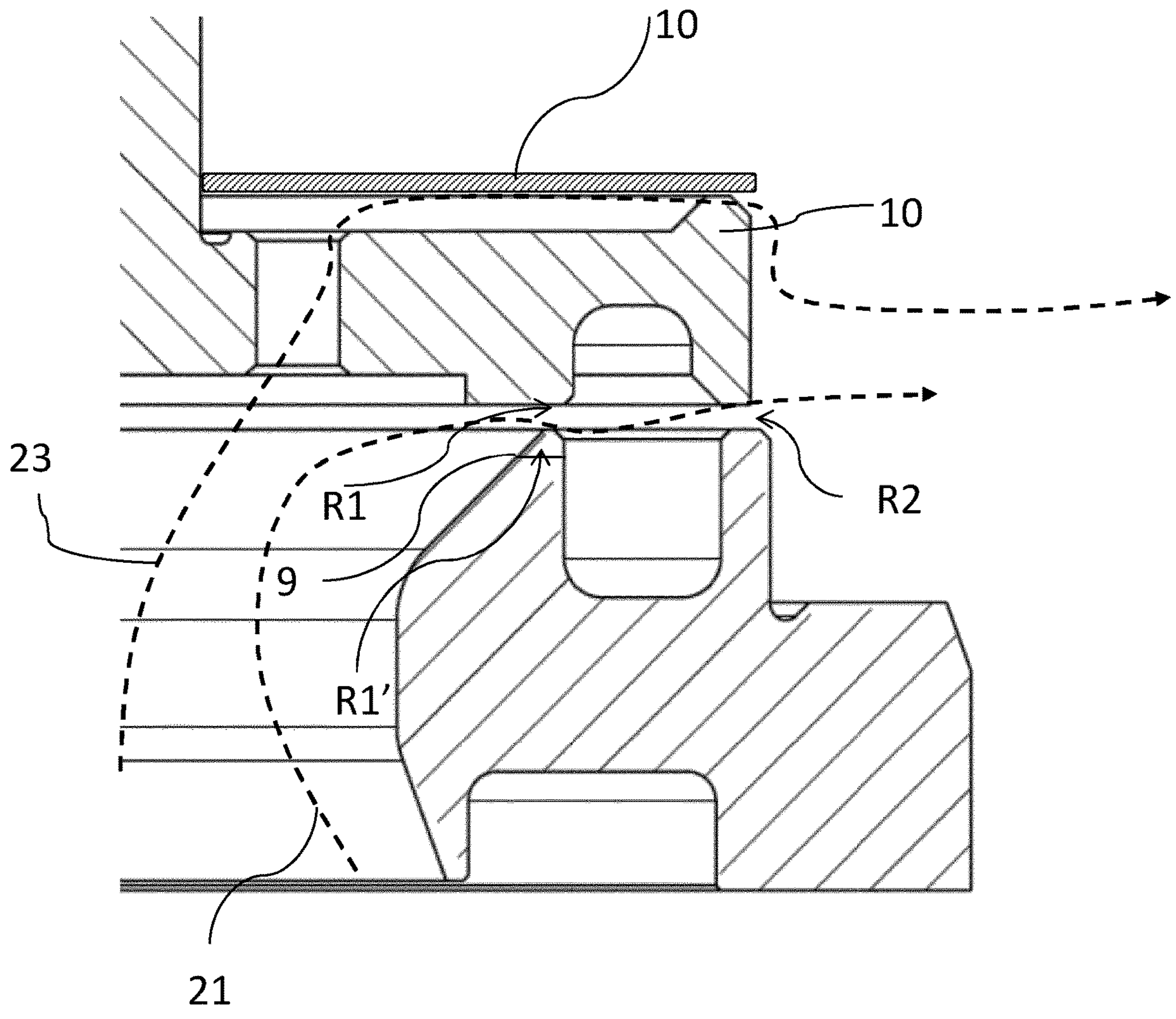

The flows are more clearly illustrated in FIG. 12*d*, which is a close-up of the components the main valve seat 9, the movable valve seat member 10 and the shim 13, or "initial bypass shim". The initial flow 23 is illustrated as flowing between the movable valve seat member 10 and the shim 13 as described above in relation to the FIG. 12*a*. Further, the main fluid flow 21 is illustrated to flow through the first R1 and third R1' restriction and subsequently the second restriction R2 as described above.

In any partly open state, the first restriction R1 is smaller than the second restriction R2, since the two restrictions are formed as circumferential restrictions and being radially displaced. Since the second restriction has a larger circumference its orifice will always be larger than the orifice of the first restriction, when formed with a common delimiter upwards (the movable valve seat member 10) and downwards (the radial side walls of the main valve seat 9). Further, the fourth restriction R1' has a constant opening. Therefore, the sum of the first restriction R1 and third restriction R1' is initially larger than the second restriction R2, but as the stroke S increases the second restriction becomes larger than the sum of the first and fourth restriction, which is further illustrated in FIGS. 13*a* and 13*b*.

Figure 13A:
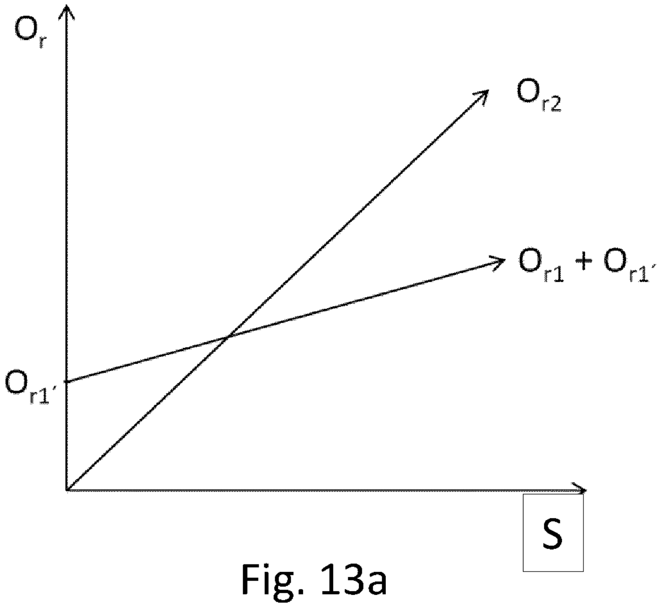
FIG. 13*a* shows a graph over the orifice openings vs. the stroke length.

FIG. 13*a* shows two graphs over the orifice openings OR1+OR1' and OR2 as a function of the stroke length S. The first orifice OR1 corresponds to the orifice of the first restriction R1. This orifice OR1 is also illustrated by the envelope surface of the circle in FIG. 13*b*, and denoted with OR1, which is thus dependent on the stroke length S. The stroke length is the axial distance between the movable valve seat member 10 and the main seat 9, when being in a regulated position, as in e.g. FIG. 12*c*. The second orifice OR2 corresponds to the orifice OR2 of the second restriction R2. This orifice is also illustrated by the envelope surface of the cylinder form in FIG. 13*b* being denoted with OR2. The third orifice OR1' corresponds to the orifice of the third restriction R1'. This orifice OR1' is also illustrated by a surface in FIG. 13*b* denoted with OR1', which corresponds to the opening into the circumferential aperture in the main valve housing 2.

Figure 13B:
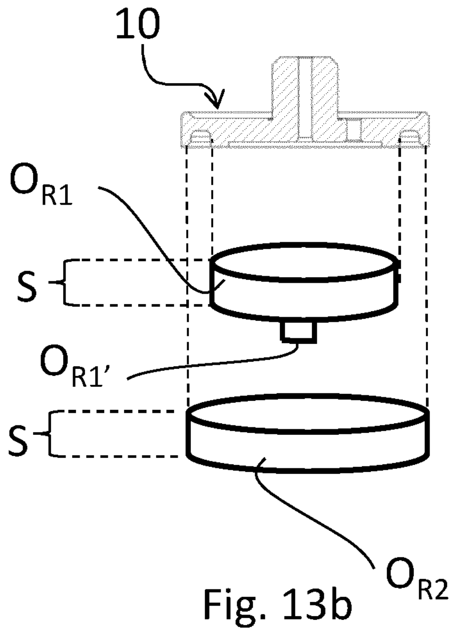
FIG. 13*b* shows an illustration of the movable valve seat member and the first, second and third orifices at a given stroke length S.

The principle sketch of FIG. 13*b* illustrates the first OR1, second OR2 and third OR1' orifices at a given stroke length S. From this illustration it is apparent how the first OR1 and second OR2 orifices vary with the stroke length S, but the third OR1' orifice is static.

In the initial phase of the regulated main fluid flow, i.e. when R1 and R2 is just opening from a closed position, the restriction will be carried out in the second restriction, which is shown in FIG. 13*a*, since the orifice of the second restriction R2 is smaller than the orifice of the first and third restriction R1+R1', in said initial stage. As soon as the orifice of the second restriction R3 is larger than the combined orifice of the first and third restriction R1+R1', the restriction is instead carried out at the first+third restrictions.

The size relationships between the orifices of the different restrictions may vary without departing from the inventive concept. By adjusting the orifice size relationships, the intersecting point between "OR1+OR1'"-curve and the "OR2"-curve the shown in FIG. 13*a* may be moved. The orifice size of OR1' is represented by where the "OR1+OR1'"-curve intercepts the Y-axis. The relation between the size of the first and second restrictions' orifices OR1 is illustrated by the different inclinations of the two curves in FIG. 13*a*. Further, by increasing the relative size of the third orifice OR1' relative the maximum orifice size of the first orifice OR1 the soft opening is prolonged.

The orifice size of the third orifice OR1' may be substantially smaller than the first orifice, e.g. about 0.1%-10% of the maximum orifice size of the first orifice OR1.

It is possible to carry out this invention regardless if a passive control of the main valve member is used, e.g. with a springing means, or it is actively controlled with e.g. an electrical actuator such as a solenoid or step motor. It is also possible that the valve arrangement is actively controlled, but with a back-up of a passive springing means if the active control is not functioning. That is, a failsafe mode controlled valve arrangement.

In the drawings and specification, there have been disclosed preferred embodiments and examples of the invention and, although specific terms are employed, they are used in a generic and descriptive sense only and not for the purpose of limitation, the scope of the invention being set forth in the following claims.

Numbered List of Embodiments

1. A valve arrangement (1) for a shock absorber, said valve arrangement comprising:
   a valve housing (2) comprising a first and a second port (7, 8);
   a pilot chamber (3) being in fluid communication with said first and/or second port, wherein a pilot pressure (PP) is defined by a hydraulic pressure in said pilot chamber;
   a main valve member (4) being axially movably along a longitudinal axis (A) in said valve housing and being arranged to interact with a main valve seat (9) of said valve housing in order to restrict a main fluid flow (21) between said first and second ports (7, 8) in response to said pilot pressure acting on said main valve member; wherein
   the main valve member (4) is resiliently loaded in a steady-state position from where it is movable in both directions along the longitudinal axis (A) and is configured to, during an initial pressure increase of the main fluid, move in a direction away from the pilot chamber (3), so as to increase the volume of the pilot chamber.
2. A valve arrangement according to embodiment 1, wherein said main valve member (4) is configured to, when the pressure of the main fluid flow exceeds a predetermined value being higher than the initial pressure increase, move towards the pilot chamber (3) so as to decrease the volume of the pilot chamber.
3. A valve arrangement according to embodiment 2, wherein said initial pressure increase and said predetermined value both occur during a main fluid pressure increase from the first port (7).
4. A valve arrangement according to any one of embodiment 1-3, wherein said main valve member (4) is resiliently loaded by a first springing means (44) on a first side of the main valve member and a second springing means (43) on an opposite second side of the main valve member.
5. A valve arrangement according to embodiment 4, wherein said first springing means (44) is at least one shim.
6. A valve arrangement according to any one of embodiments 4 or 5, wherein said second springing means (43) is a coil spring.

7. A valve arrangement according to any one of embodiments 1-6, wherein said first springing means is arranged between the main valve member (4) and the main valve seat (9).
8. A valve arrangement according to any one of embodiments 1-7, wherein the main valve member comprises a pilot chamber exposed pressure area (45) being larger than a pressure area on an axially opposite side acting on the main valve member when the main valve member is in said steady-state position.
9. A valve arrangement according to any one of embodiments 1-8, wherein said main valve member (4) comprise a bypass channel (48) fluidly connecting said first port (7) to said pilot chamber (3).
10. A valve arrangement according to any one of embodiments 1-9, wherein the pilot pressure is actively controlled with an electrical actuator (5) such as a solenoid or a step motor.
11. A valve arrangement according to any one of embodiments 1-10, wherein pilot pressure is controlled with a failsafe mechanical springing valve (33) when the actuator is fed a current below a threshold value.
12. A valve arrangement according to any one of embodiments 1-11, wherein the main valve body moves away from the pilot chamber upon the initial pressure increase with a stroke length of about 0.05-0.5 mm, preferably about 0.1 mm.
13. A valve arrangement according to any one of embodiments 4-6, further comprising a calibration spacer (6) for calibrating the maximum load of the first springing means 44.
14. A shock absorber (100) comprising at least one valve arrangement (1*a*; 1*b*) according to any one of the preceding embodiments.
15. A method for controlling a damping medium flow between damping chambers of a shock absorber by means of a valve arrangement comprising a valve housing (2) comprising a first and a second port (7, 8), a pilot chamber (3) being in fluid communication with said first and/or second port, wherein a pilot pressure (PP) is defined by a hydraulic pressure in said pilot chamber, and a main valve member (4) being axially movably arranged in said valve housing and being arranged to interact with a main valve seat (9) of said valve housing in order to restrict a main fluid flow (21) between said first and second ports (7, 8) in response to said pilot pressure acting on said main valve member, the method comprising the steps of
    resiliently loading (S1) a valve member (4) in a steady-state position,
    moving (S2) the main valve member (4), during an initial pressure increase of the main fluid, in a direction away from the pilot chamber (3), so as to increase the volume of the pilot chamber.
16. A method according to embodiment 15, further comprising the subsequent step of
    moving (S3) the main valve member (4) in a direction towards the pilot chamber (3), so as to subsequently decrease the volume of the pilot chamber, when the pressure of the main fluid flow exceeds a predetermined value being higher than the initial pressure increase.

The invention claimed is:

1. A valve arrangement for a shock absorber, said valve arrangement comprising:

a valve housing comprising a first and a second port;

a pilot chamber being in fluid communication with said first and/or second port, wherein a pilot pressure is defined by a hydraulic pressure in said pilot chamber;

a main valve member being axially movably along a longitudinal axis in said valve housing and being arranged to interact with a main valve seat of said valve housing in order to restrict a main fluid flow between said first and second ports in response to said pilot pressure acting on said main valve member;

wherein the main valve member is resiliently loaded in a steady-state position from where it is movable in both directions along the longitudinal axis and is configured to, during an initial pressure increase of the main fluid, move in a direction away from the pilot chamber, so as to increase the volume of the pilot chamber, and wherein the valve arrangement further comprises an axially movable valve seat member arranged axially between the main valve member and the main valve seat, wherein said axially movable valve seat member comprises a first restriction and a cooperating serially arranged second restriction wherein a first orifice of the first restriction and a second orifice of the second restriction are controlled by means of the axial position of the main valve member relative the housing.

2. The valve arrangement according to claim 1, wherein said first restriction is arranged upstream relative the second restriction in a main fluid flow during a compression stroke.

3. The valve arrangement according to claim 1, wherein said first orifice of the first restriction always is smaller than the second orifice of the second restriction in a main fluid flow during a compression stroke.

4. The valve arrangement according to claim 1, wherein said first orifice is at least partly circumferential between the movable valve seat member and the main valve seat.

5. The valve arrangement according to claim 1, wherein said second restriction is arranged radially outside of said first restriction between the movable valve seat member and the main valve seat.

6. The valve arrangement according to claim 1, wherein the first restriction is radially spaced from the second restriction by means of a circumferential aperture in the movable valve seat member.

7. The valve arrangement according to claim 6, wherein the main valve seat comprises a circumferential aperture aligned with the circumferential aperture in the movable valve seat member.

8. The valve arrangement according to claim 1, further comprising at least one shim arranged between the main valve member and moveable valve member in an initial flow channel.

9. The valve arrangement according to claim 8, wherein the at least one shim is configured to deflect in response to a pressure increase in the main fluid flow so as to allow an initial fluid flow between the first and second port.

10. The valve arrangement according to claim 1, wherein said main valve member is configured to, when the pressure of the main fluid flow exceeds a predetermined value being higher than the initial pressure increase, move towards the pilot chamber so as to decrease the volume of the pilot chamber.

11. The valve arrangement according to claim 10, wherein said initial pressure increase and said predetermined value both occur during a main fluid pressure increase from the first port.

12. The valve arrangement according to claim 1, wherein said main valve member is resiliently loaded by a first springing means on a first side of the main valve member and a second springing means on an opposite second side of the main valve member.

13. The valve arrangement according to claim 1, further comprising a third restriction) being arranged in series with the second restriction, wherein the third restriction) has a constant orifice being independent of the axial position of the main valve member relative the valve housing.

14. A shock absorber comprising the valve arrangement according to claim 1.

15. A method for controlling a damping medium flow between damping chambers of a shock absorber by means of a valve arrangement comprising a valve housing comprising a first and a second port, a pilot chamber being in fluid communication with said first and/or second port, wherein a pilot pressure is defined by a hydraulic pressure in said pilot chamber, and a main valve member being axially movably arranged in said valve housing and being arranged to interact with a main valve seat of said valve housing in order to restrict a main fluid flow between said first and second ports in response to said pilot pressure acting on said main valve member, the method comprising the steps of resiliently loading a valve member in a steady-state position, moving the main valve member, during an initial pressure increase of the main fluid, in a direction away from the pilot chamber, so as to increase the volume of the pilot chamber, moving the main valve member in a direction towards the pilot chamber, so as to subsequently decrease the volume of the pilot chamber, when the pressure of the main fluid flow exceeds a predetermined value being higher than the initial pressure increase, and during an active flow control mode restricting the main fluid flow at a first restriction and a cooperating serially arranged second restriction by controlling a first orifice of the first restriction and a second orifice of the second restriction by means of controlling the axial position of the main valve member relative the housing.

* * * * *